(12) United States Patent
Kim et al.

(10) Patent No.: US 11,720,202 B2
(45) Date of Patent: Aug. 8, 2023

(54) DISPLAY DEVICE

(71) Applicant: Samsung Display Co., Ltd., Yongin-si (KR)

(72) Inventors: Soowon Kim, Cheonan-si (KR); Jaseung Ku, Yongin-si (KR); Hyungchul Kim, Hwaseong-si (KR); Yerin Oh, Ulsan (KR)

(73) Assignee: Samsung Display Co., Ltd., Yongin-si (KR)

( * ) Notice: Subject to any disclaimer, the term of this patent is extended or adjusted under 35 U.S.C. 154(b) by 96 days.

(21) Appl. No.: 17/305,502

(22) Filed: Jul. 8, 2021

(65) Prior Publication Data

US 2022/0147214 A1   May 12, 2022

(30) Foreign Application Priority Data

Nov. 6, 2020  (KR) .................... 10-2020-0147860

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05); *G06F 3/0446* (2019.05); *G06F 2203/04102* (2013.01); *G06F 2203/04111* (2013.01)

(58) Field of Classification Search
CPC .. G06F 3/04164; G06F 3/0446; G06F 3/0443; G06F 2203/04102; G06F 2203/04111
USPC ........................................................ 345/174
See application file for complete search history.

(56) References Cited

U.S. PATENT DOCUMENTS

| 10,379,669 | B2  |   | 8/2019  | Oh et al. |              |
|------------|-----|---|---------|-----------|--------------|
| 2013/0300678 | A1 | * | 11/2013 | Kang      | G06F 3/0446  |
|            |     |   |         |           | 345/173      |
| 2016/0178949 | A1 | * | 6/2016  | Wang      | G02F 1/134309 |
|            |     |   |         |           | 345/173      |
| 2018/0097197 | A1 | * | 4/2018  | Han       | G06F 1/3265  |
| 2018/0367736 | A1 | * | 12/2018 | Lombardi  | G06F 3/04847 |
| 2019/0235681 | A1 | * | 8/2019  | Li        | G06F 3/0445  |

(Continued)

FOREIGN PATENT DOCUMENTS

| KR | 10-1146098 B1     | 5/2012  |
|----|-------------------|---------|
| KR | 10-2017-0123851 A | 11/2017 |
| KR | 10-2020-0034388 A | 3/2020  |

*Primary Examiner* — Mark Edwards
(74) *Attorney, Agent, or Firm* — Lewis Roca Rothgerber, Christie LLP

(57) ABSTRACT

A display device includes: a display panel including: a display layer; and a sensor layer on the display layer, and including first, second, and third areas; a first driver electrically connected with the sensor layer through a first pad area; and a second driver electrically connected with the sensor layer through a second pad area. The sensor layer includes: a plurality of electrodes at the first, second, and third areas; a plurality of first intersecting electrodes at the first area, and electrically connected with the first driver; a plurality of second intersecting electrodes at the second area, and electrically connected with the first driver and the second driver; and a plurality of third intersecting electrodes at the third area, and electrically connected with the second driver. Each of the first pad area and the second pad area is spaced from the second area in a first direction.

21 Claims, 17 Drawing Sheets

(56) References Cited

U.S. PATENT DOCUMENTS

2020/0097128 A1    3/2020  Jung et al.
2020/0125194 A1*  4/2020  Jiang .................... G06F 1/1641

* cited by examiner

DISPLAY DEVICE

CROSS-REFERENCE TO RELATED APPLICATIONS

This application claims priority to and the benefit of Korean Patent Application No. 10-2020-0147860, filed on Nov. 6, 2020, in the Korean Intellectual Property Office, the entire disclosure of which is incorporated by reference herein.

BACKGROUND

Aspects of one or more embodiments of the present disclosure relate to a display device, and more particularly, to a display device having improved sensing performance.

Multimedia electronic devices, for example, such as televisions, mobile phones, tablet computers, navigation devices, game machines, and the like, include display devices for displaying images. The display devices may include sensor layers (or input sensors) capable of providing touch-based input methods that enable users to intuitively and conveniently input information and/or instructions, in addition to other input methods, for example, such as a button, a keyboard, a mouse, and/or the like.

The above information disclosed in this Background section is for enhancement of understanding of the background of the present disclosure, and therefore, it may contain information that does not constitute prior art.

SUMMARY

One or more embodiments of the present disclosure are directed to a display device having improved sensing performance.

According to one or more embodiments of the present disclosure, a display device includes: a display panel including: a display layer configured to display an image; and a sensor layer on the display layer, and configured to sense an external input, the sensor layer including a first area, a second area adjacent to the first area in a first direction, and a third area adjacent to the second area in the first direction; a first driver electrically connected with the sensor layer through a first pad area of the display panel; and a second driver electrically connected with the sensor layer through a second pad area of the display panel. The sensor layer includes: a plurality of electrodes spaced from each other along a second direction crossing the first direction, each of the plurality of electrodes being located at the first area, the second area, and the third area; a plurality of first intersecting electrodes at the first area, and spaced from each other along the first direction, the plurality of first intersecting electrodes being electrically connected with the first driver; a plurality of second intersecting electrodes at the second area, and spaced from each other along the first direction, the plurality of second intersecting electrodes being electrically connected with the first driver and the second driver; and a plurality of third intersecting electrodes at the third area, and spaced from each other along the first direction, the plurality of third intersecting electrodes being electrically connected with the second driver. Each of the first pad area and the second pad area is spaced from the second area in the first direction.

In an embodiment, the first pad area and the second pad area may be spaced from each other with the first to third areas therebetween.

In an embodiment, the display device may further include: a circuit film attached to the first pad area and the second pad area, and the first driver and the second driver may be on the circuit film.

In an embodiment, the circuit film may include: a first connecting line configured to connect the first driver and one of the plurality of second intersecting electrodes to each other; and a second connecting line configured to connect the second driver and another one of the plurality of second intersecting electrodes to each other.

In an embodiment, the display device may further include: a first circuit film attached to the first pad area; and a second circuit film attached to the second pad area, and electrically connected to the first circuit film. The first driver may be on the first circuit film, and the second driver may be on the second circuit film.

In an embodiment, the sensor layer may include an active area, and a peripheral area around the active area, and the plurality of electrodes, the plurality of first intersecting electrodes, the plurality of second intersecting electrodes, and the plurality of third intersecting electrodes may be at the active area. The sensor layer may further include: a first connecting line at the peripheral area, and surrounding the active area, the first connecting line being electrically connected with one of the plurality of second intersecting electrodes; and a second connecting line at the peripheral area and surrounding the active area, the second connecting line being electrically connected with another one of the plurality of second intersecting electrodes.

In an embodiment, the first driver and the second driver may be electrically connected with the first connecting line and the second connecting line, respectively.

In an embodiment, the first pad area and the second pad area may be spaced from the third area in the first direction, and may be adjacent to each other in the second direction. The display device may further include a circuit film attached to the first pad area and the second pad area, and the first driver and the second driver may be on the circuit film.

In an embodiment, the circuit film may include: a first line electrically connected to one of the plurality of second intersecting electrodes, and to the second driver; a second line electrically connected to another one of the plurality of second intersecting electrodes, and to the first driver; a first connecting line configured to connect the first line and the first driver to each other; and a second connecting line configured to connect the second line and the second driver to each other.

In an embodiment, the display panel may include: a plurality of first pads at the first pad area; and a plurality of second pads at the second pad area, and the plurality of first pads may be spaced from each other in the second direction, and the plurality of second pads may be spaced from each other in the second direction.

In an embodiment, the display panel may include a folding area configured to be folded and unfolded about a folding axis extending in the second direction, the folding axis overlapping with the second area.

According to one or more embodiments of the present disclosure, a display device includes: a display panel including: a display layer configured to display an image; and a sensor layer on the display layer, and configured to sense an external input, the sensor layer including a first area, a second area adjacent to the first area in a first direction, and a third area adjacent to the second area in the first direction; a first driver electrically connected with the sensor layer through a first pad area of the display panel; and a second driver electrically connected with the sensor layer through a second pad area of the display panel. The display panel is configured to be folded and unfolded about a folding axis extending in a second direction crossing the first direction, the folding axis overlapping with the second area, and the display panel further includes: a plurality of first pads at the first pad area, and spaced from each other in the second direction; and a plurality of second pads at the second pad area, and spaced from each other in the second direction.

In an embodiment, the sensor layer may include: a plurality of electrodes spaced from each other in the second direction, each of the plurality of electrodes being located at the first area, the second area, and the third area; a plurality of first intersecting electrodes at the first area, and spaced from each other in the first direction, the plurality of first intersecting electrodes being electrically connected with the first driver; a plurality of second intersecting electrodes at the second area, and spaced from each other in the first direction, the plurality of second intersecting electrodes being electrically connected with the first driver and the second driver; and a plurality of third intersecting electrodes at the third area, and spaced from each other in the first direction, the plurality of third intersecting electrodes being electrically connected with the second driver.

In an embodiment, the sensor layer may further include: a first connecting line electrically connected to one of the plurality of second intersecting electrodes; and a second connecting line electrically connected with another one of the plurality of second intersecting electrodes. Each of the first connecting line and the second connecting line may surround the plurality of electrodes, the plurality of first intersecting electrodes, the plurality of second intersecting electrodes, and the plurality of third intersecting electrodes.

In an embodiment, the display device may further include: a circuit film attached to the first pad area and the second pad area, and the first driver and the second driver may be on the circuit film.

In an embodiment, the circuit film may include: a first connecting line configured to connect the first driver and one of the plurality of second intersecting electrodes to each other; and a second connecting line configured to connect the second driver and another one of the plurality of second intersecting electrodes to each other.

In an embodiment, the first pad area and the second pad area may be spaced from each other with the first to third areas therebetween.

In an embodiment, the first pad area and the second pad area may be spaced from the third area in the first direction, and may be adjacent to each other in the second direction.

According to one or more embodiments of the present disclosure, a display device includes: a sensor layer including: a plurality of electrodes; and a plurality of first, second, and third intersecting electrodes crossing the plurality of electrodes; a first driver electrically connected with the plurality of first intersecting electrodes and the plurality of second intersecting electrodes through a plurality of first pads; and a second driver electrically connected with the plurality of second intersecting electrodes and the plurality of third intersecting electrodes through a plurality of second pads. The sensor layer includes: a first area, the plurality of first intersecting electrodes being located at the first area; a second area, the plurality of second intersecting electrodes being located at the second area; and a third area, the plurality of third intersecting electrodes being located at the third area, and the first area, the second area, and the third area are adjacent to each another along a first direction. The second area is configured to be folded and unfolded about a folding axis extending in a second direction crossing the first direction, and the plurality of first pads are spaced from the second area in the first direction, the plurality of second pads are spaced from the second area in the first direction, and the plurality of first pads and the plurality of second pads are spaced from each other in the second direction.

In an embodiment, the display device may further include: a circuit film attached to the plurality of first pads and the plurality of second pads, the first driver and the second driver being located on the circuit film, and the circuit film may include: a first connecting line configured to connect the first driver and one of the plurality of second intersecting electrodes to each other; and a second connecting line configured to connect the second driver and another one of the plurality of second intersecting electrodes to each other.

In an embodiment, the sensor layer may further include: a first connecting line electrically connected to one of the plurality of second intersecting electrodes; and a second connecting line electrically connected to another one of the plurality of second intersecting electrodes. Each of the first connecting line and the second connecting line may surround the plurality of electrodes, the plurality of first intersecting electrodes, the plurality of second intersecting electrodes, and the plurality of third intersecting electrodes.

BRIEF DESCRIPTION OF THE FIGURES

The above and other aspects and features of the present disclosure will be more clearly understood from the following detailed description of the illustrative, non-limiting example embodiments with reference to the accompanying drawings.

DETAILED DESCRIPTION

Figure 1A:
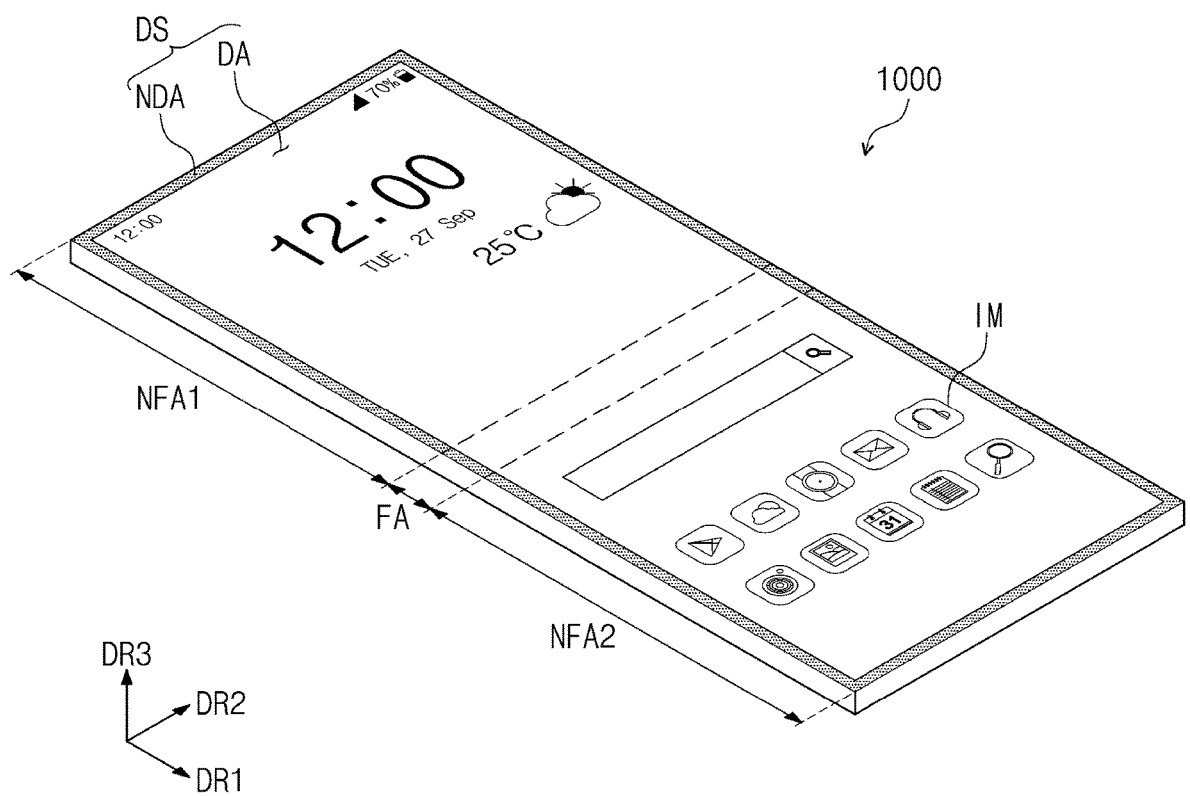
FIG. 1A is a perspective view of a display device according to an embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the first direction DR1, the second direction DR2, and the third direction DR3 are not limited to three axes of the rectangular coordinate system, and may be interpreted in a broader sense. For example, the first direction DR1, the second direction DR2, and the third direction DR3 may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components (e.g., the display driving unit, the sensor driving unit, the main driving unit, and the like) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
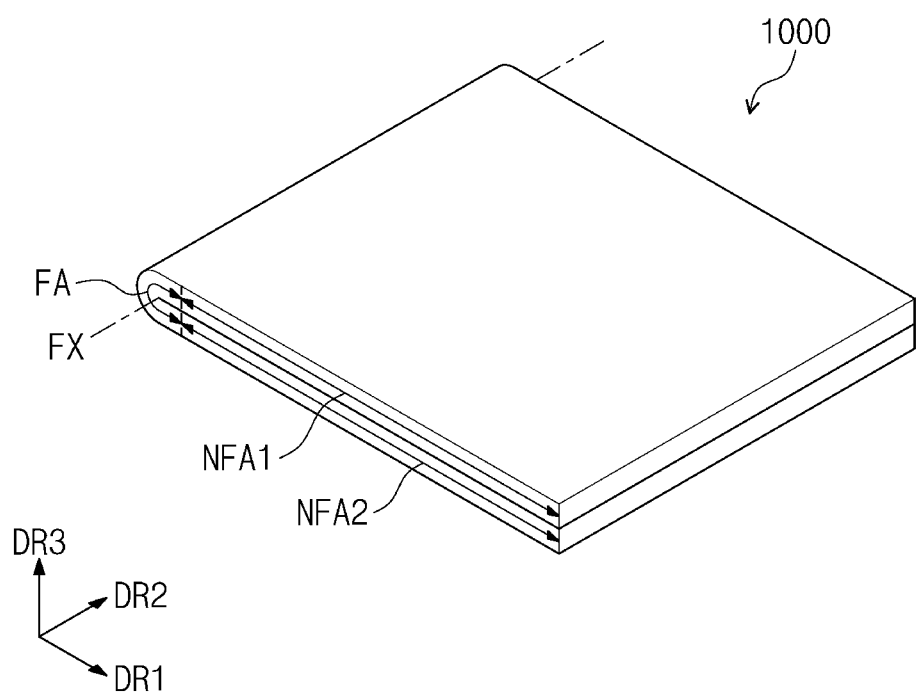
FIG. 1B is a perspective view illustrating a folded state of the display device illustrated in FIG. 1A.

FIG. 1A is a perspective view of a display device according to an embodiment of the present disclosure. FIG. 1B is a perspective view illustrating a folded state of the display device illustrated in FIG. 1A.

Referring to FIGS. 1A and 1B, the display device 1000 may include a display surface DS defined by a first direction DR1 and a second direction DR2 that crosses the first direction DR1. The display device 1000 may provide an image IM to a user through the display surface DS.

The display surface DS may include a display area DA, and a non-display area NDA around (e.g., adjacent to) the display area DA. The display area DA may display the image IM, and the non-display area NDA may not display an image. The non-display area NDA may surround (e.g., around a periphery of) the display area DA. However, the present disclosure is not limited to the shapes of the display area DA and the non-display area NDA shown in FIG. 1A, and the shape of the display area DA and the shape of the non-display area NDA may be variously modified.

Hereinafter, a direction that orthogonally or substantially orthogonally crosses a plane defined by the first direction DR1 and the second direction DR2 is defined as a third direction (e.g., a thickness direction) DR3. Furthermore, the expression "on the plane" as used herein may be defined as a state viewed from (or in) the third direction DR3, or in other words, a plan view (e.g., a view from a direction that is perpendicular to or substantially perpendicular to a top surface of a relevant layer or element, for example, such as the display surface DS).

The display device 1000 may include a folding area FA, and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The first non-folding area NFA1, the folding area FA, and the second non-folding area NFA2 may be sequentially defined in the display device 1000 along the first direction DR1.

Although one folding area FA and two non-folding areas NFA1 and NFA2 are illustrated in FIG. 1A, the number of folding areas FA and the number of non-folding areas NFA1 and NFA2 are not limited thereto. For example, the display device 1000 may include three or more non-folding areas, and a plurality of folding areas disposed between the non-folding areas.

Referring to FIG. 1B, the display device 1000 may be a foldable display device 1000 that is folded and/or unfolded. For example, the folding area FA may be bent about a folding axis FX that is parallel to or substantially parallel to the second direction DR2, so that the display device 1000 may be folded. The folding axis FX may be defined as a short axis that is parallel to or substantially parallel to short sides of the display device 1000, but the present disclosure is not particularly limited thereto.

In an embodiment of the present disclosure, the display device 1000 may be folded in an in-folding manner, such that the first non-folding area NFA1 and the second non-folding area NFA2 face each other, and the display surface DS is not exposed to the outside.

In an embodiment of the present disclosure, the display device 1000 may be folded in an out-folding manner, such that the display surface DS is exposed to the outside. As another example, in an embodiment of the present disclosure, the display device 1000 may be configured to be repeatedly in-folded and out-folded, but the present disclosure is not limited thereto. In an embodiment of the present disclosure, the display device 1000 may be configured to selectively perform at least one of an unfolding operation, an in-folding operation, and/or an out-folding operation.

Figure 2:
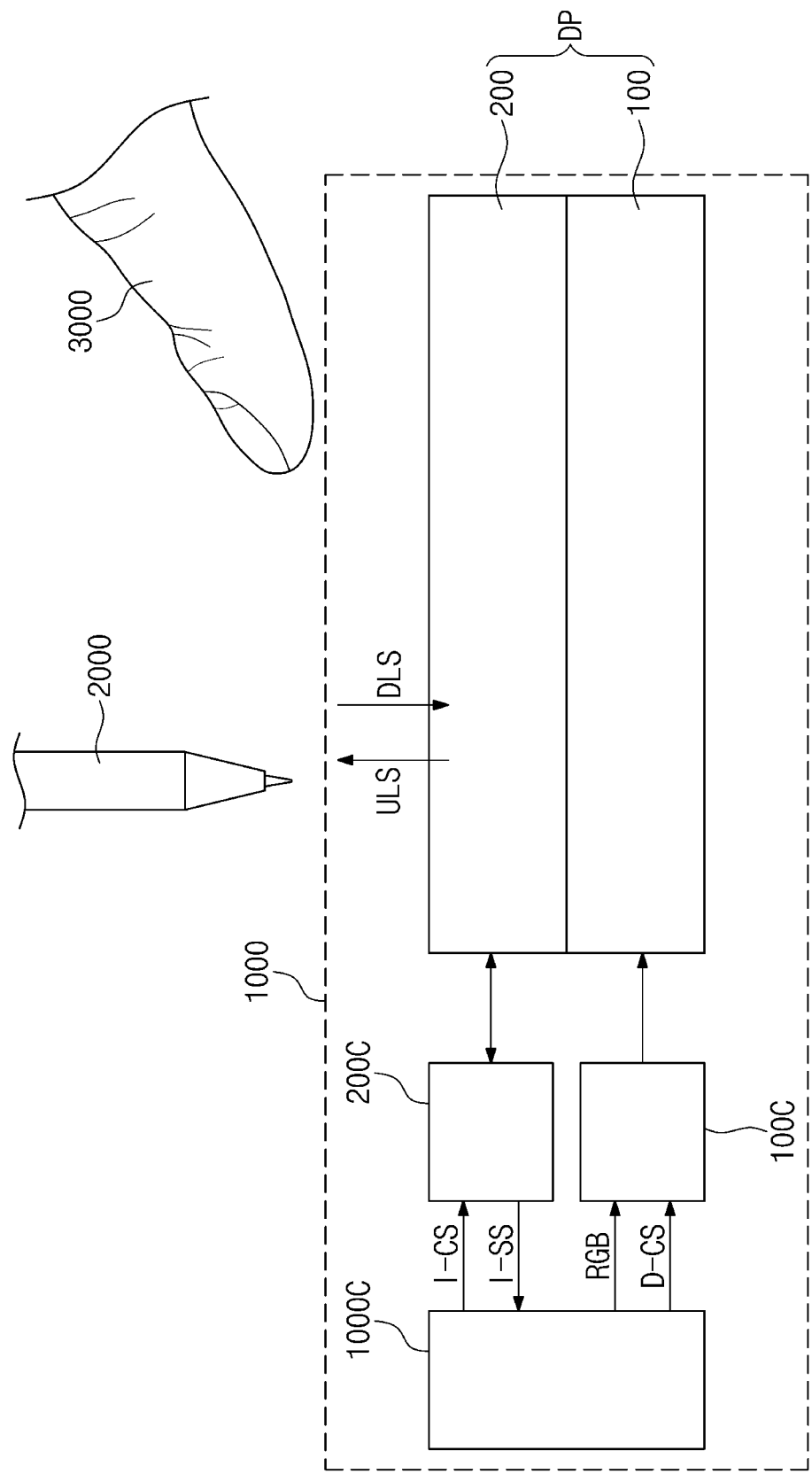
FIG. 2 is a view illustrating an operation between the display device and an input device according to an embodiment of the present disclosure.

FIG. 2 is a view illustrating an operation between the display device and an input device according to an embodiment of the present disclosure.

Referring to FIG. 2, the display device 1000 may sense various inputs applied from the outside. For example, the display device 1000 may sense both a first input by the input device 2000, and a second input by a touch 3000. The input device 2000 may be an input means of an active type that provides a drive signal. The input device 2000 may be, for example, an active pen. The touch 3000 may include any suitable input means, for example, such as a part of a user's body, a passive pen, and/or the like, which are capable of causing a change in a capacitance.

The display device 1000 and the input device 2000 may perform two-way communications with each other. The display device 1000 may provide an uplink signal ULS to the input device 2000, and the input device 2000 may provide a downlink signal DLS to the display device 1000. For example, the uplink signal ULS may include various suitable information, for example, such as panel information, protocol version, or the like, but the present disclosure is not particularly limited thereto. The downlink signal DLS may include a synchronization signal, or state information of the input device 2000. For example, the downlink signal DLS may include coordinate information of the input device 2000, battery information of the input device 2000, tilt information of the input device 2000, and/or various pieces of information stored in the input device 2000, but the present disclosure is not particularly limited thereto.

The display device 1000 may include a display panel DP, a display driving unit (e.g., a display driver or a display driving circuit) 100C, a sensor driving unit (e.g., a sensor driver or a sensor driving circuit) 200C, and a main driving unit (e.g., a main driver or a main driving circuit) 1000C. The display panel DP may include a display layer 100 and a sensor layer 200.

The display layer 100 may be a component that generates or substantially generates an image. The display layer 100 may be an emissive display layer. For example, the display layer 100 may be an organic light emitting display layer, a quantum dot display layer, a micro-LED display layer, or a nano-LED display layer.

The sensor layer 200 may be disposed on the display layer 100. The sensor layer 200 may sense an external input applied from the outside. The sensor layer 200 may sense the first input by the input device 2000, and the second input by the touch 3000. In an embodiment, the sensor layer 200 may be an external sensor that is attached to the display layer 100. In an embodiment, the sensor layer 200 may be an integrated sensor that is formed (e.g., continuously formed) in a manufacturing process of the display layer 100.

The main driving unit 1000C may control an overall operation of the display device 1000. For example, the main driving unit 1000C may control operations of the display driving unit 100C and the sensor driving unit 200C. The main driving unit 1000C may include at least one microprocessor. The main driving unit 1000C may be referred to as a host.

The display driving unit 100C may drive the display layer 100. The main driving unit 1000C may further include a graphic controller. The display driving unit 100C may receive image data RGB and a control signal D-CS from the main driving unit 1000C. The control signal D-CS may include various suitable signals. For example, the control signal D-CS may include an input vertical synchronization signal, an input horizontal synchronization signal, a main clock, a data enable signal, and the like. Based on the control signal D-CS, the display driving unit 100C may generate a vertical synchronization signal and a horizontal synchronization signal for controlling a timing at which a signal is provided to the display layer 100.

The sensor driving unit 200C may drive the sensor layer 200. The sensor driving unit 200C may receive a control signal I-CS from the main driving unit 1000C. The control signal I-CS may include a mode determination signal for determining a driving mode of the sensor driving unit 200C, and a clock signal. Based on the control signal I-CS, the sensor driving unit 200C may operate in a first mode for sensing the first input by the input device 2000, or may operate in a second mode for sensing the second input by the touch 3000. The sensor driving unit 200C may operate in the first mode or the second mode according to (e.g., based on) the mode determination signal.

The sensor driving unit 200C may calculate coordinate information of the first input or the second input based on a signal received from the sensor layer 200, and may provide a coordinate signal I-SS having the coordinate information to the main driving unit 1000C. The main driving unit 1000C executes an operation corresponding to a user's input based on the coordinate signal I-SS. For example, the main driving unit 1000C may operate the display driving unit 100C to display a new application image at (e.g., in or on) the display layer 100 based on the coordinate signal I-SS.

Figure 3A:
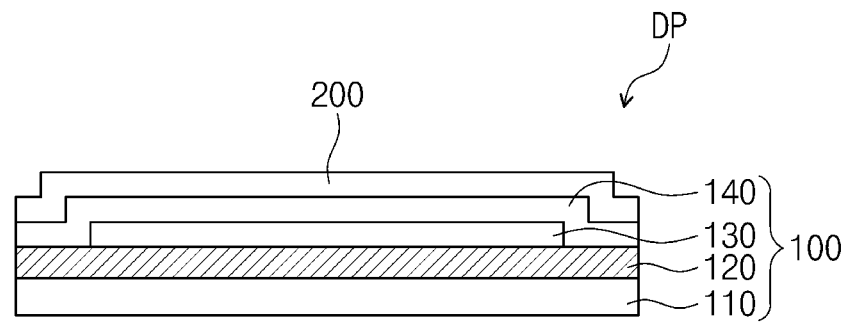
FIG. 3A is a cross-sectional view of a display panel according to an embodiment of the present disclosure.
Figure 3A:
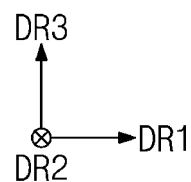

FIG. 3A is a cross-sectional view of the display panel according to an embodiment of the present disclosure.

Referring to FIG. 3A, the display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may be a glass substrate, a metal substrate, a polymer substrate, or the like. However, the present disclosure is not limited thereto, and the base layer 110 may be an inorganic layer, an organic layer, or a composite layer.

The base layer 110 may have a multilayered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

The first and second synthetic resin layers may each include (e.g., may each contain) a polyimide-based resin. As another example, the first and second synthetic resin layers may each include at least one of an acrylate-based resin, a methacrylate-based resin, a polyisoprene-based resin, a vinyl-based resin, an epoxy-based resin, a urethane-based resin, a celluose-based resin, a siloxane-based resin, a polyamide-based resin, and/or a perylene-based resin. Meanwhile, as used herein, the term "~~"-based resin refers to an element, member, or layer that includes a "~~" functional group.

The circuit layer 120 may be disposed on the base layer 110. The circuit layer 120 may include an insulation layer, a semiconductor pattern, a conductive pattern, a signal line, and the like. The insulation layer, a semiconductor layer, and a conductive layer may be formed on the base layer 110 by a suitable method, for example, such as coating, deposition, or the like, and may be selectively patterned by performing a photolithography process a plurality of times. Thereafter, the semiconductor pattern, the conductive pattern, and the signal line, which are included in the circuit layer 120, may be formed.

The light emitting element layer 130 may be disposed on the circuit layer 120. The light emitting element layer 130 may include light emitting elements. For example, the light emitting element layer 130 may include organic light emitting materials, quantum dots, quantum rods, micro-LEDs, or nano-LEDs.

The encapsulation layer 140 may be disposed on the light emitting element layer 130. The encapsulation layer 140 may protect the light emitting element layer 130 from foreign matter, for example, such as moisture, oxygen, and dust particles.

The sensor layer 200 may be disposed on the display layer 100. The sensor layer 200 may sense the external input applied from the outside. The external input may be an input of a user. The input of the user may include various suitable forms of external inputs, for example, such as a part of the user's body, a pen, light, heat, pressure, and/or the like.

The sensor layer 200 may be formed on the display layer 100 through a continuous process. In this case, the sensor layer 200 may be expressed as being directly disposed on the display layer 100. When the sensor layer 200 is directly disposed on the display layer 100, a third component may not be disposed between the sensor layer 200 and the display layer 100. In other words, a separate adhesive member may not be disposed between the sensor layer 200 and the display layer 100. However, the present disclosure is not limited thereto, and in another embodiment, the sensor layer 200 may be separately formed and attached to the display layer 100 via a separate adhesive member.

Figure 3B:
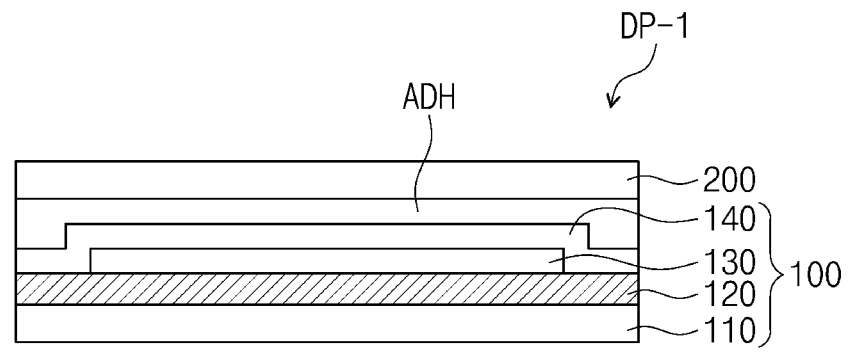
FIG. 3B is a cross-sectional view of a display panel according to an embodiment of the present disclosure.
Figure 3B:
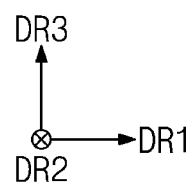

FIG. 3B is a cross-sectional view of a display panel according to an embodiment of the present disclosure.

Referring to FIG. 3B, the display panel DP-1 may include the display layer 100, the sensor layer 200, and an adhesive layer ADH disposed between the display layer 100 and the sensor layer 200. The sensor layer 200 may be connected to (e.g., coupled to or attached to) the display layer 100 by the adhesive layer ADH. When the sensor layer 200 is connected to the display layer 100 by the adhesive layer ADH as shown in FIG. 3B, the sensor layer 200 may be referred to as an external sensor layer 200.

The adhesive layer ADH may include (e.g., may contain) a general adhesive or sticky substance. For example, the adhesive layer ADH may be a transparent adhesive layer, for example, such as a pressure sensitive adhesive (PSA) film, an optically clear adhesive (OCA) film, or an optically clear resin (OCR).

Figure 4:
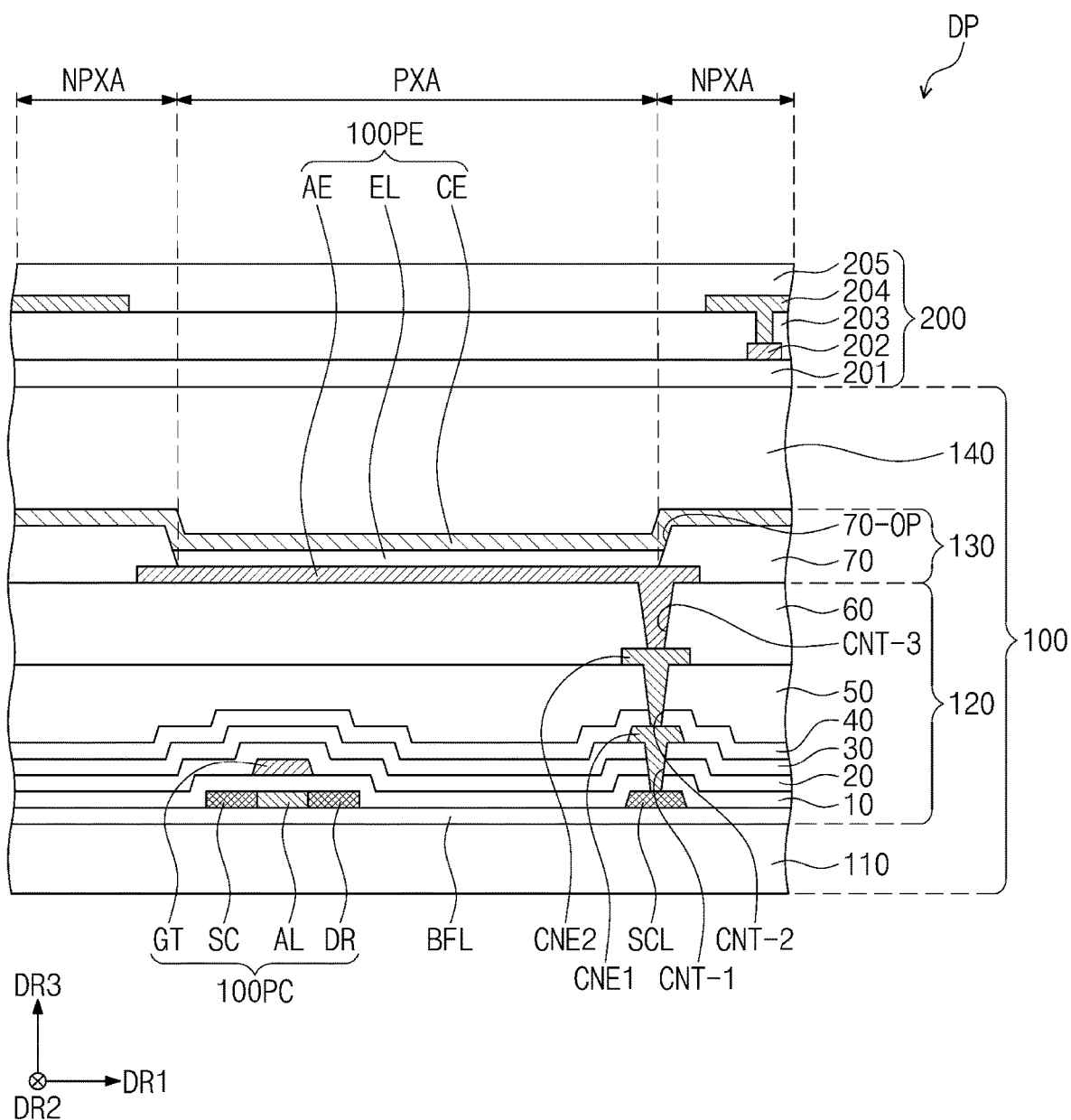
FIG. 4 is a cross-sectional view of a display panel according to an embodiment of the present disclosure.

FIG. 4 is a cross-sectional view of a display panel according to an embodiment of the present disclosure. FIG. 4 is a more detailed cross-sectional view of the display panel DP illustrated in FIG. 3A. The display panel DP-1 illustrated in FIG. 3B may correspond to a structure shown in FIG. 4, except that the adhesive layer ADH (e.g., refer to FIG. 3B) is additionally disposed between the display layer 100 and the sensor layer 200 illustrated in FIG. 4.

Referring to FIG. 4, at least one inorganic layer is formed on an upper surface of the base layer 110. The inorganic layer may include at least one of aluminum oxide, titanium oxide, silicon oxide, silicon nitride, silicon oxynitride, zirconium oxide, and/or hafnium oxide. The inorganic layer may be formed in multiple layers. The multiple inorganic layers may constitute (e.g., may form or may be included in) a barrier layer and/or a buffer layer. In the present embodiment, the display layer 100 is illustrated as including a buffer layer BFL.

The buffer layer BFL may improve a bonding force between the base layer 110 and a semiconductor pattern. The buffer layer BFL may include at least one of silicon oxide, silicon nitride, and/or silicon oxynitride. For example, the buffer layer BFL may include a structure in which silicon oxide layers and silicon nitride layers are alternately stacked one above another.

The semiconductor pattern may be disposed on the buffer layer BFL. The semiconductor pattern may include polysilicon. However, the present disclosure is not limited thereto, and the semiconductor pattern may include amorphous silicon, low-temperature polycrystalline silicon, or an oxide semiconductor.

FIG. 4 illustrates a portion of the semiconductor pattern, and the semiconductor pattern may be additionally disposed in other areas. The semiconductor pattern may be arranged across pixels according to a suitable rule (e.g., a predetermined or specific rule). The semiconductor pattern may have different electrical properties depending on whether the semiconductor pattern is doped or not. The semiconductor pattern may include a first area having a high conductivity, and a second area having a low conductivity. The first area may be doped with an N-type dopant or a P-type dopant. A P-type transistor may include a doped area doped with a P-type dopant, and an N-type transistor may include a doped area doped with an N-type dopant. The second area may be an undoped area, or may be an area that is more lightly doped than the first area.

The first area may have a higher conductivity than the second area, and may serve or substantially serve as an electrode or a signal line. The second area may correspond to or substantially correspond to an active area (or a channel) of a transistor. In other words, a portion of the semiconductor pattern may be an active area of the transistor, another portion may be a source or drain of the transistor, and another portion may be a connecting electrode or a connecting signal line.

Each of the pixels may include an equivalent circuit including seven transistors, one capacitor, and a light emitting element. However, the present disclosure is not limited thereto, and the equivalent circuit of the pixel may be variously modified as needed or desired. FIG. 4 illustrates one transistor 100PC and one light emitting element 100PE included in the pixel.

A source SC, an active area AL, and a drain DR of the transistor 100PC may be formed from the semiconductor pattern. The source SC and the drain DR may extend from the active area AL in opposite directions in the cross-section. FIG. 4 illustrates a portion of a connecting signal line SCL formed from the semiconductor pattern. Although not separately illustrated, the connecting signal line SCL may be connected to the drain DR of the transistor 100PC on the plane (e.g., in a plan view).

A first insulation layer 10 may be disposed on the buffer layer BFL. The first insulation layer 10 may commonly overlap with a plurality of pixels, and may cover the semiconductor pattern. The first insulation layer 10 may be an inorganic layer and/or an organic layer, and may have a single layer structure or a multilayered structure. The first insulation layer 10 may include at least one of aluminum oxide, titanium oxide, silicon oxide, silicon nitride, silicon oxynitride, zirconium oxide, and/or hafnium oxide. In the present embodiment, the first insulation layer 10 may be a single layer of silicon oxide. The first insulation layer 10 as well as various insulation layers of the circuit layer 120 that will be described in more detail below may be inorganic layers and/or organic layers, and may have a single layer structure or a multilayered structure. The inorganic layers may include at least one of the aforementioned materials, but the present disclosure is not limited thereto.

A gate GT of the transistor 100PC is disposed on the first insulation layer 10. The gate GT may be a portion of a metal pattern. The gate GT overlaps with the active area AL. The gate GT may function as a mask in a process of doping the semiconductor pattern.

The second insulation layer 20 may be disposed on the first insulation layer 10, and may cover the gate GT. The second insulation layer 20 may commonly overlap with the pixels. The second insulation layer 20 may be an inorganic layer and/or an organic layer, and may have a single layer structure or a multilayered structure. The second insulation layer 20 may include at least one of silicon oxide, silicon nitride, and/or silicon oxynitride. In the present embodiment, the second insulation layer 20 may have a multilayered structure including a silicon oxide layer and a silicon nitride layer.

A third insulation layer 30 may be disposed on the second insulation layer 20. The third insulation layer 30 may have a single layer structure or a multilayered structure. For example, the third insulation layer 30 may have a multilayered structure including a silicon oxide layer and a silicon nitride layer.

A first connecting electrode CNE1 may be disposed on the third insulation layer 30. The first connecting electrode CNE1 may be connected to the connecting signal line SCL through a contact hole CNT-1 formed through (e.g., penetrating) the first, second, and third insulation layers 10, 20, and 30.

A fourth insulation layer 40 may be disposed on the third insulation layer 30. The fourth insulation layer 40 may be a single layer of silicon oxide. A fifth insulation layer 50 may be disposed on the fourth insulation layer 40. The fifth insulation layer 50 may be an organic layer.

A second connecting electrode CNE2 may be disposed on the fifth insulation layer 50. The second connecting electrode CNE2 may be connected to the first connecting electrode CNE1 through a contact hole CNT-2 formed through (e.g., penetrating) the fourth insulation layer 40 and the fifth insulation layer 50.

A sixth insulation layer 60 may be disposed on the fifth insulation layer 50, and may cover the second connecting electrode CNE2. The sixth insulation layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinafter, for convenience, the light emitting element 100PE is described in more detail as an organic light emitting element. However, the present disclosure is not particularly limited thereto.

The light emitting element 100PE may include a first electrode AE, a light emitting layer EL, and a second electrode CE.

The first electrode AE may be disposed on the sixth insulation layer 60. The first electrode AE may be connected to the second connecting electrode CNE2 through a contact hole CNT-3 formed through (e.g., penetrating) the sixth insulation layer 60.

A pixel defining film 70 may be disposed on the sixth insulation layer 60, and may cover a portion of the first electrode AE. An opening 70-OP is defined in the pixel defining film 70. The opening 70-OP of the pixel defining film 70 exposes at least a portion of the first electrode AE.

The display area DA (e.g., refer to FIG. 1A) may include an emissive area PXA, and a non-emissive area NPXA adjacent to the emissive area PXA. The non-emissive area NPXA may surround (e.g., around a periphery of) the emissive area PXA. In the present embodiment, the emissive area PXA is defined to correspond to a partial area of the first electrode AE that is exposed by the opening 70-OP.

The light emitting layer EL may be disposed on the first electrode AE. The light emitting layer EL may be disposed in an area corresponding to the opening 70-OP. In other words, the light emitting layer EL may be separately formed for each of the pixels. When the light emitting layer EL is separately formed for each of the pixels, the light emitting layers EL may each emit at least one of a blue light, a red light, or a green light. However, the present disclosure is not limited thereto, and the light emitting layer EL may be commonly disposed for the pixels. In this case, the light emitting layer EL may provide a blue light or a white light.

The second electrode CE may be disposed on the light emitting layer EL. The second electrode CE may have an integrated shape, and may be commonly disposed for the plurality of pixels.

In some embodiments, a hole control layer may be disposed between the first electrode AE and the light emitting layer EL. The hole control layer may be commonly disposed at (e.g., in or on) the emissive area PXA and the non-emissive area NPXA. The hole control layer may include a hole transporting layer, and may further include a hole injection layer. An electron control layer may be disposed between the light emitting layer EL and the second electrode CE. The electron control layer may include an electron transporting layer, and may further include an electron injection layer. The hole control layer and the electron control layer may be commonly formed for the plurality of pixels by using an open mask.

The encapsulation layer 140 may be disposed on the light emitting element layer 130. The encapsulation layer 140 may include an inorganic layer, an organic layer, and an inorganic layer that are sequentially stacked one above another. However, the layers constituting the encapsulation layer 140 are not limited thereto.

The inorganic layers may protect the light emitting element layer 130 from moisture and oxygen, and the organic layer may protect the light emitting element layer 130 from foreign matter, for example, such as dust particles. The inorganic layers may include a silicon nitride layer, a silicon oxynitride layer, a silicon oxide layer, a titanium oxide layer, or an aluminum oxide layer. The organic layer may include, but is not limited to, an acrylate-based organic layer.

The sensor layer 200 may include a base layer 201, a first conductive layer 202, a sensing insulation layer 203, a second conductive layer 204, and a cover insulation layer 205.

The base layer 201 may be an inorganic layer including at least one of silicon nitride, silicon oxynitride, and/or silicon oxide. As another example, the base layer 201 may be an organic layer including an epoxy resin, an acrylic resin, or an imide-based resin. The base layer 201 may have a single layer structure, or may have a multilayered structure that is stacked along the third direction DR3.

Each of the first conductive layer 202 and the second conductive layer 204 may have a single layer structure, or may have a multilayered structure that is stacked along the third direction DR3.

The conductive layer having the single layer structure may include a metal layer or a transparent conductive layer. The metal layer may include molybdenum, silver, titanium, copper, aluminum, or an alloy thereof. The transparent conductive layer may include a transparent conductive oxide, for example, such as indium tin oxide (ITO), indium zinc oxide (IZO), zinc oxide (ZnO), indium zinc tin oxide (IZTO), or the like. In addition, the transparent conductive layer may include a conductive polymer, for example, such as PEDOT, a metal nano wire, graphene, or the like.

The conductive layer having the multilayered structure may include various metal layers. The metal layers may have, for example, a three-layered structure of titanium/aluminum/titanium. The conductive layer having the multilayered structure may include at least one metal layer, and at least one transparent conductive layer.

At least one of the sensing insulation layer 203 and the cover insulation layer 205 may include an inorganic film. The inorganic film may include at least one of aluminum oxide, titanium oxide, silicon oxide, silicon nitride, silicon oxynitride, zirconium oxide, and/or hafnium oxide.

At least one of the sensing insulation layer 203 and/or the cover insulation layer 205 may include an organic film. The organic film may include at least one of an acrylate-based resin, a methacrylate-based resin, a polyisoprene-based resin, a vinyl-based resin, an epoxy-based resin, a urethane-based resin, a celluose-based resin, a siloxane-based resin, a polyimide-based resin, a polyimide-based resin, and/or a perylene-based resin.

Figure 5:
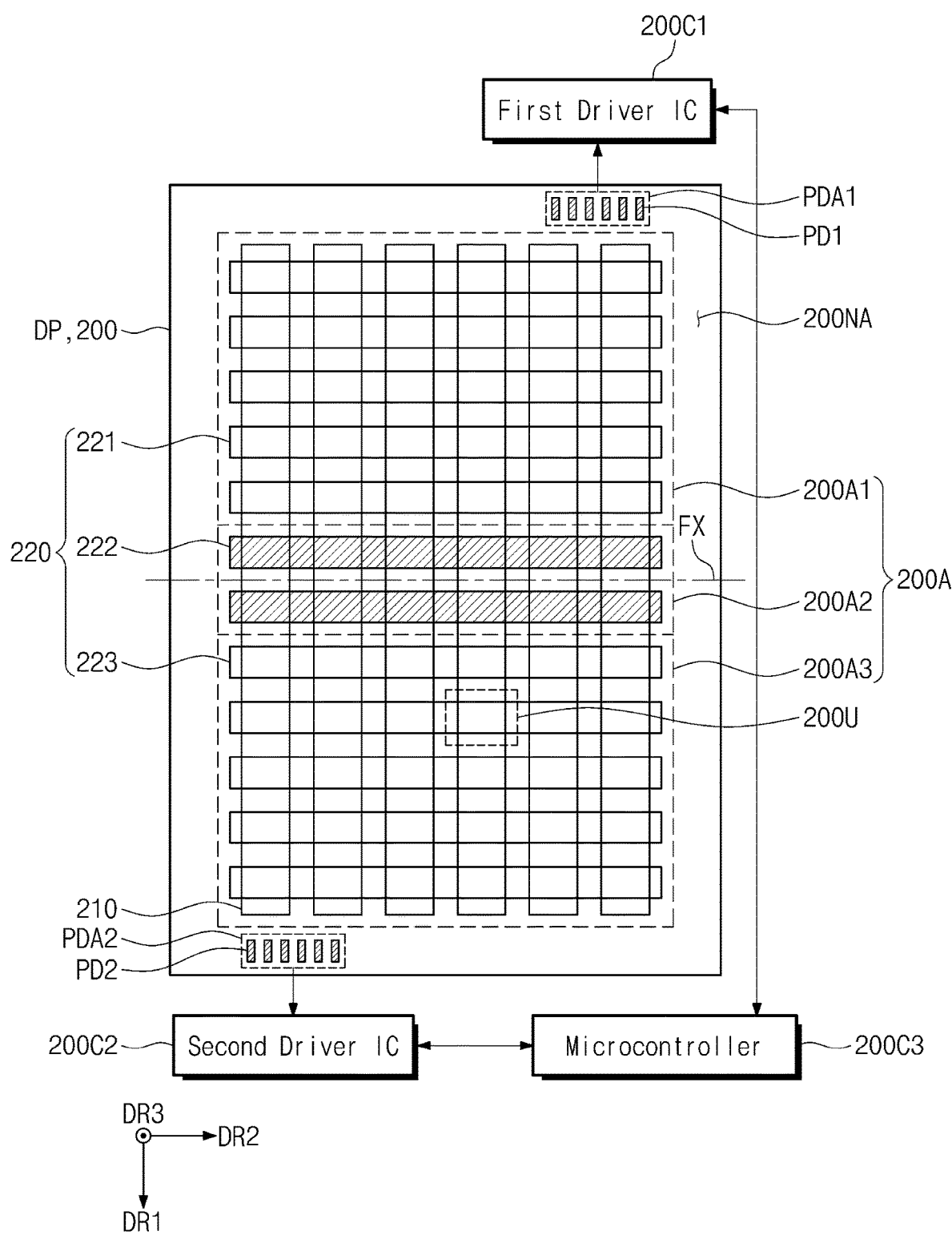
FIG. 5 is a block diagram of a sensor layer and a sensor driving unit according to an embodiment of the present disclosure.

FIG. 5 is a block diagram of the sensor layer and the sensor driving unit according to an embodiment of the present disclosure.

Referring to FIGS. 2 and 5, an active area 200A and a peripheral area 200NA may be defined at (e.g., in or on) the sensor layer 200. The active area 200A may be an area for sensing an external input, and the peripheral area 200NA may be defined around the active area 200A. The peripheral area 200NA may surround (e.g., around a periphery of) the active area 200A. However, the present disclosure is not limited thereto, and the shape of the active area 200A and the shape of the peripheral area 200NA may be variously modified.

The sensor layer 200 may include a plurality of electrodes 210 and a plurality of intersecting electrodes 220 disposed at (e.g., in or on) the active area 200A. The plurality of electrodes 210 may extend in the first direction DR1, and may be spaced apart from each other along the second direction DR2, which crosses the first direction DR1. The plurality of intersecting electrodes 220 may insulatively cross the plurality of electrodes 210. The plurality of intersecting electrodes 220 may extend in the second direction DR2, and may be spaced apart from each other along the first direction DR1.

The sensor driving unit 200C may include a first driver IC 200C1, a second driver IC 200C2, and a microcontroller 200C3. The first driver IC 200C1, the second driver IC 200C2, and the microcontroller 200C3 may be separate integrated circuits (ICs) from one another. The microcontroller 200C3 may be an IC that is separate from the first driver IC 200C1 and the second driver IC 200C2, but the present disclosure is not limited thereto. For example, the microcontroller 200C3 may be embedded in the first driver IC 200C1 or the second driver IC 200C2.

The sensor layer 200 may be controlled by the first driver IC 200C1 and the second driver IC 200C2. For example, an area sensed by the first driver IC 200C1, an area sensed by the second driver IC 200C2, and an area sensed by the first driver IC 200C1 and the second driver IC 200C2 may be defined at (e.g., in or on) the sensor layer 200.

For example, a first area 200A1, a second area 200A2, and a third area 200A3 may be defined at (e.g., in or on) the active area 200A of the sensor layer 200. The second area 200A2 may be adjacent to the first area 200A1 in the first direction DR1, and the third area 200A3 may be adjacent to the second area 200A2 in the first direction DR1. In other words, the first area 200A1, the second area 200A2, and the third area 200A3 may be sequentially defined along the first direction DR1.

The area sensed by the first driver IC 200C1 may be defined as the first area 200A1, the area sensed by the second driver IC 200C2 may be defined as the third area 200A3, and the area sensed by the first and second driver ICs 200C1 and 200C2 may be defined as the second area 200A2. The second area 200A2 may be defined as a boundary area.

The sensor layer 200 may be operated in the first mode or the second mode by the first driver IC 200C1 and the second driver IC 200C2. However, the present disclosure is not limited thereto, and the sensor layer 200 may be operated in only the second mode.

The first mode may be a mode in which the display device 1000 and the input device 2000 transmit and receive data with each other. In the first mode, the plurality of electrodes 210 and the plurality of intersecting electrodes 220 may each be used as a transmitter electrode for providing an uplink signal ULS from the sensor driving unit 200C to the input device 2000, but the present disclosure is not particularly limited thereto. For example, the plurality of electrodes 210 or the plurality of intersecting electrodes 220 may be used as the transmitter electrodes.

In the second mode, the sensor driving unit 200C may sense the second input by the touch 3000. In the second mode, the sensor driving unit 200C may sense an external input by detecting a change in a mutual capacitance formed between the plurality of electrodes 210 and the plurality of intersecting electrodes 220.

The sensor driving unit 200C may provide a transmission (TX) signal (or a driving signal) to the plurality of electrodes 210. The sensor driving unit 200C may receive a reception (RX) signal (or a sensing signal) from the plurality of intersecting electrodes 220. In other words, in the second mode, the plurality of electrodes 210 may function as transmitter electrodes, and the plurality of intersecting electrodes 220 may function as receiver electrodes.

Each of the plurality of electrodes 210 may be disposed at (e.g., in or on) all of the first area 200A1, the second area 200A2, and the third area 200A3. In other words, each of the plurality of electrodes 210 may extend across each of the first area 200A1, the second area 200A2, and the third area 200A3. The plurality of intersecting electrodes 220 may include first intersecting electrodes 221 disposed at (e.g., in or on) the first area 200A1, second intersecting electrodes 222 disposed at (e.g., in or on) the second area 200A2, and third intersecting electrodes 223 disposed at (e.g., in or on) the third area 200A3.

All of the plurality of electrodes 210 may be electrically connected to one of the first driver IC 200C1 or the second driver IC 200C2. As another example, some of the plurality of electrodes 210 may be electrically connected to the first driver IC 200C1, and others of the plurality of electrodes 210 may be electrically connected to the second driver IC 200C2.

The first intersecting electrodes 221 may be electrically connected to the first driver IC 200C1, the second intersecting electrodes 222 may be electrically connected to the first driver IC 200C1 and the second driver IC 200C2, and the third intersecting electrodes 223 may be electrically connected to the second driver IC 200C2.

Because the first driver IC 200C1 and the second driver IC 200C2 are separate ICs from each other, there may be a difference between a value sensed by the first driver IC 200C1 and a value sensed by the second driver IC 200C2. In this case, as the second intersecting electrodes 222 disposed at (e.g., in or on) the boundary area (e.g., the second area 200A2) are connected with both the first driver IC 200C1 and the second driver IC 200C2, the difference may be decreased. Accordingly, sensing performance of the sensor layer 200 may be improved.

Although FIG. 5 illustrates an example in which two second intersecting electrodes 222 are provided at the boundary area (e.g., the second area 200A2), the number of second intersecting electrodes 222 is not particularly limited thereto. For example, two or more second intersecting electrodes 222 may be arranged at the boundary area (e.g., the second area 200A2), and may be connected to both the first driver IC 200C1 and the second driver IC 200C2. When the sensor layer 200 is driven by the plurality of driver ICs, the sensor layer 200 may be applied even though the size of the display panel DP may be increased.

The microcontroller 200C3 may serve as a host controller of the sensor driving unit 200C. For example, the microcontroller 200C3 may control operation timings of the first driver IC 200C1 and the second driver IC 200C2, and may collect and provide data obtained by the first driver IC 200C1 and the second driver IC 200C2 to the main driving unit 1000C. The microcontroller 200C3 may calculate sensing signals obtained from the second intersecting electrodes 222 by the first driver IC 200C1 and sensing signals obtained from the second intersecting electrodes 222 by the second driver IC 200C2, and may decrease a sensing difference between the first driver IC 200C1 and the second driver IC 200C2.

The display panel DP or the sensor layer 200 may include a plurality of first pads PD1 and a plurality of second pads PD2. The plurality of first pads PD1 may be disposed at (e.g., in or on) a first pad area PDA1, and the plurality of second pads PD2 may be disposed at (e.g., in or on) a second pad area PDA2. The first driver IC 200C1 may be electrically connected with the sensor layer 200 through the plurality of first pads PD1, and the second driver IC 200C2 may be electrically connected with the sensor layer 200 through the plurality of second pads PD2.

The first pad area PDA1 and the second pad area PDA2 may each be spaced apart from the second area 200A2 in the first direction DR1. The plurality of first pads PD1 may be arranged along the second direction DR2 at the first pad area PDA1, and the plurality of second pads PD2 may be arranged along the second direction DR2 at the second pad area PDA2.

The folding axis FX may overlap with the second area 200A2, and may extend along the second direction DR2. The plurality of first pads PD1 and the plurality of second pads PD2 may each be arranged along the same or substantially the same direction as the extension direction of the folding axis FX, for example, along the second direction DR2. The first pad area PDA1 and the second pad area PDA2 may be spaced apart from the folding axis FX in the first direction DR1. For example, the first pad area PDA1 and the second pad area PDA2 may be spaced apart from each other with the first, second, and third areas 200A1, 200A2, and 200A3 therebetween.

Figure 6:
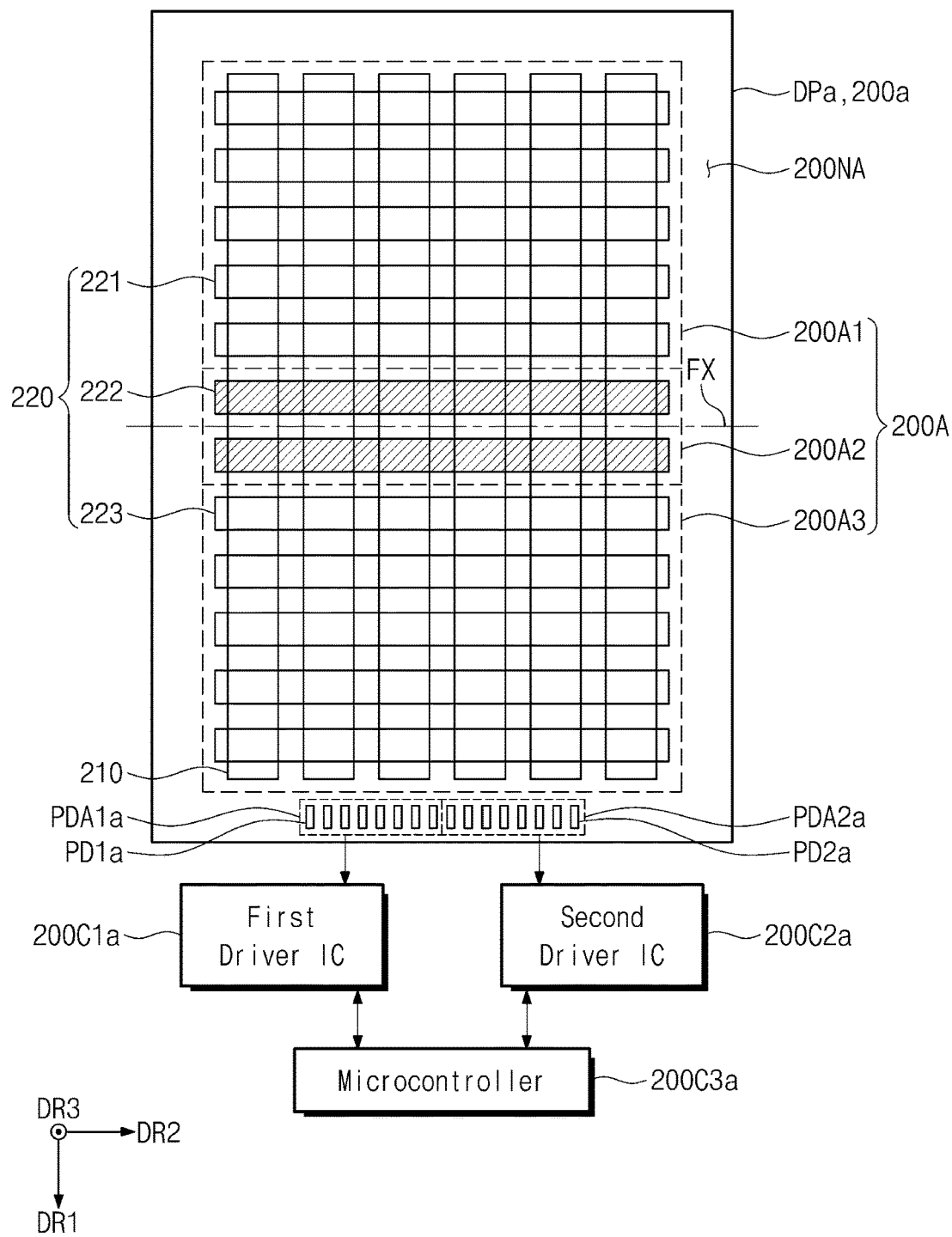
FIG. 6 is a block diagram of a sensor layer and a sensor driving unit according to an embodiment of the present disclosure.

FIG. 6 is a block diagram of a sensor layer and a sensor driving unit according to an embodiment of the present disclosure. In FIG. 6, the components that are the same or substantially the same as the components described above with reference to FIG. 5 are denoted with the same reference symbols, and thus, redundant description thereof may not be repeated, and the differences between the embodiments of FIGS. 5 and 6 may be mainly described in more detail hereinafter.

Referring to FIGS. 2 and 6, the sensor driving unit 200C may include a first driver IC 200C1a, a second driver IC 200C2a, and a microcontroller 200C3a.

A display panel DPa or the sensor layer 200a may include a plurality of first pads PD1a and a plurality of second pads PD2a. The plurality of first pads PD1a may be disposed at (e.g., in or on) a first pad area PDA1a, and the plurality of second pads PD2a may be disposed at (e.g., in or on) a second pad area PDA2a. The first driver IC 200C1a may be electrically connected with the sensor layer 200a through the plurality of first pads PD1a, and the second driver IC 200C2a may be electrically connected with the sensor layer 200a through the plurality of second pads PD2a.

The first pad area PDA1a and the second pad area PDA2a may be spaced apart from the second area 200A2 in the first direction DR1. The first pad area PDA1a and the second pad area PDA2a may be spaced apart from the third area 200A3 in the first direction DR1. The first pad area PDA1a and the second pad area PDA2a may be adjacent to each other in the second direction DR2.

The plurality of first pads PD1a and the plurality of second pads PD2a may be arranged along the second direction DR2. The first pads PD1a and the second pads PD2a may be arranged side by side in the same or substantially the same direction as the extending direction in which the folding axis FX extends.

Figure 7:
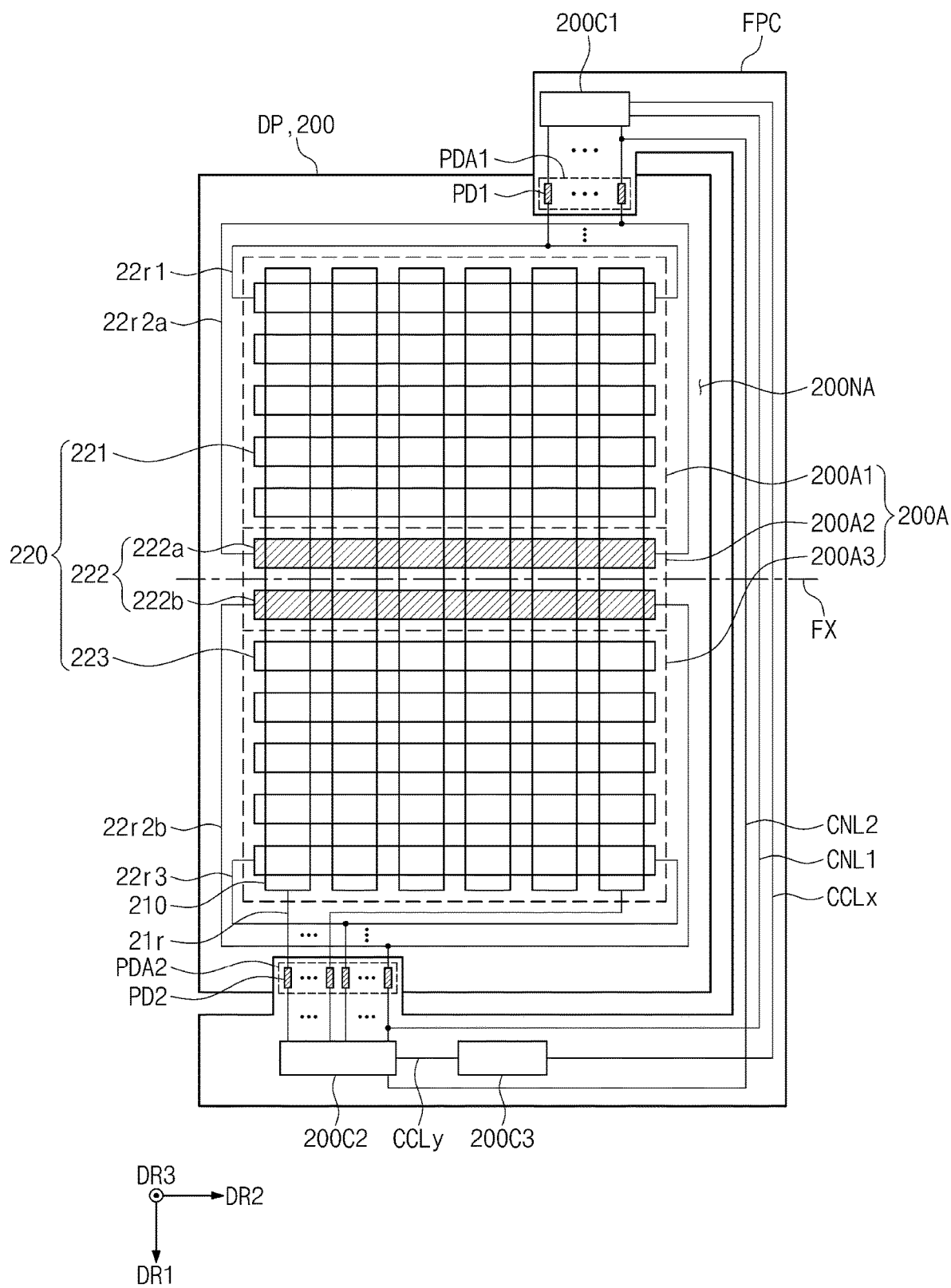
FIG. 7 is a plan view illustrating a display panel and a circuit film according to an embodiment of the present disclosure.

FIG. 7 is a plan view illustrating a display panel and a circuit film according to an embodiment of the present disclosure.

Referring to FIGS. 5 and 7, the circuit film FPC may be attached to the display panel DP. The circuit film FPC may be a flexible circuit film. The circuit film FPC may be connected to (e.g., coupled to or attached to) the first pad area PDA1 and the second pad area PDA2. While an example shape of the circuit film FPC is illustrated in FIG. 7, the shape of the circuit film FPC is not limited to the example illustrated in FIG. 7. For example, as long as the circuit film FPC is capable of being connected to (e.g., coupled to or attached to) the first pad area PDA1 and the second pad area PDA2, the shape of the circuit film FPC is not particularly limited and may be variously modified.

In an embodiment of the present disclosure, a portion of the display panel DP where the first pad area PDA1 is defined and a portion of the display panel DP where the second pad area PDA2 is defined may be bent toward a rear surface of the display panel DP. In this case, the area (e.g., the size) of the non-display area NDA (e.g., refer to FIG. 1A) of the display device 1000 may be decreased. This will be described in more detail below with reference to FIGS. 12A and 12B.

The first driver IC 200C1, the second driver IC 200C2, and the microcontroller 200C3 may be mounted on the circuit film FPC. The first driver IC 200C1 may be electrically connected with the display panel DP, for example, with the sensor layer 200, through the plurality of first pads PD1 provided at (e.g., in or on) the first pad area PDA1. The second driver IC 200C2 may be electrically connected with the display panel DP, for example, with the sensor layer 200, through the plurality of second pads PD2 provided at (e.g., in or on) the second pad area PDA2.

The first intersecting electrodes 221 may be electrically connected to the first driver IC 200C1, the second intersecting electrodes 222 may be electrically connected to both the first driver IC 200C1 and the second driver IC 200C2, and the third intersecting electrodes 223 may be electrically connected to the second driver IC 200C2.

The second intersecting electrodes 222 may be referred to as boundary electrodes. For example, from among the intersecting electrodes 220, all of the intersecting electrodes disposed at (e.g., in or on) one side of the second intersecting electrodes 222 may be electrically connected to the first driver IC 200C1, and all of the intersecting electrodes disposed at (e.g., in or on) an opposite side of the second intersecting electrodes 222 may be electrically connected to the second driver IC 200C2.

The second intersecting electrodes 222 may include a first boundary electrode 222a that is adjacent to the first intersecting electrodes 221, and a second boundary electrode 222b that is adjacent to the third intersecting electrodes 223. The folding axis FX may be defined (e.g., may extend in the extending direction) between the first boundary electrode 222a and the second boundary electrode 222b.

In FIG. 7, an example in which all of the plurality of electrodes 210 are electrically connected to the second driver IC 200C2 is shown. However, the present disclosure is not limited thereto. For example, all of the plurality of electrodes 210 may be electrically connected to the first driver IC 200C1. As another example, some of the plurality of electrodes 210 may be electrically connected to the first driver IC 200C1, and others of the plurality of electrodes 210 may be electrically connected to the second driver IC 200C2.

Trace lines 21r, 22r1, 22r2a, 22r2b, and 22r3 may be disposed at (e.g., in or on) the peripheral area 200NA of the sensor layer 200. For example, the trace lines 21r, 22r1, 22r2a, 22r2b, and 22r3 may include first trace lines 21r, second trace lines 22r1, a third trace line 22r2a, a fourth trace line 22r2b, and fifth trace lines 22r3.

The first trace lines 21r may be connected to the plurality of electrodes 210 in a one-to-one correspondence. Each of the first trace lines 21r may be connected to a corresponding one of the second pads PD2. Accordingly, the plurality of electrodes 210 may be electrically connected to the second driver IC 200C2 via the corresponding second pads PD2.

The second trace lines 22r1 may be connected to the plurality of first intersecting electrodes 221. For example, one first intersecting electrode 221 may be connected with two second trace lines 22r1. One of the two second trace lines 22r1 may be connected to one end of the one first intersecting electrode 221, and the other thereof may be connected to an opposite end of the one first intersecting electrode 221. The two second trace lines 22r1 that are connected to the same one of the first intersecting electrodes 221 may each be connected to the same one of the first pads PD1. Although FIG. 7 illustrates an example in which the two second trace lines 22r1 connected to the same first intersecting electrode 221 are connected to one first pad PD1, the present disclosure is not limited thereto. For example, the two second trace lines 22r1 may be connected to two first pads PD1, respectively. The plurality of first intersecting electrodes 221 may be electrically connected to the first driver IC 200C1 via corresponding first pads PD1.

The third trace line 22r2a may be connected to the first boundary electrode 222a. The third trace line 22r2a may be connected to one of the first pads PD1. Accordingly, the first boundary electrode 222a may be electrically connected to the first driver IC 200C1 via a corresponding one of the first pads PD1.

The fourth trace line 22r2b may be connected to the second boundary electrode 222b. The fourth trace line 22r2b may be connected to one of the second pads PD2. Accordingly, the second boundary electrode 222b may be electrically connected to the second driver IC 200C2 via a corresponding one of the second pads PD2.

The fifth trace lines 22r3 may be connected to the plurality of third intersecting electrodes 223. For example, one third intersecting electrode 223 may be connected with two fifth trace lines 22r3. One of the two fifth trace lines 22r3 may be connected to one end of the one third intersecting electrode 223, and the other thereof may be connected to an opposite end of the one third intersecting electrode 223. The two fifth trace lines 22r3 that are connected to the same one of the third intersecting electrodes 223 may each be connected to the same one of the second pads PD2. Although FIG. 7 illustrates an example in which the two fifth trace lines 22r3 connected to the same third intersecting electrode 223 are connected to one second pad PD2, the present disclosure is not limited thereto. For example, the two fifth trace lines 22r3 may be connected to two second pads PD2, respectively. The plurality of third intersecting electrodes 223 may be electrically connected to the second driver IC 200C2 via corresponding second pads PD2.

The circuit film FPC may include a first connecting line CNL1, a second connecting line CNL2, a third connecting line CCLx, and a fourth connecting line CCLy. In addition, various communication lines may be further included in the circuit film FPC. For example, the circuit film FPC may further include lines for I2C, SPI, or USB communication.

The first driver IC 200C1 and the second boundary electrode 222b may be electrically connected to each other by the first connecting line CNL1. The second driver IC 200C2 and the first boundary electrode 222a may be electrically connected to each other by the second connecting line CNL2. The first driver IC 200C1 and the microcontroller 200C3 may be electrically connected to each other by the third connecting line CCLx. The second driver IC 200C2 and the microcontroller 200C3 may be electrically connected to each other by the fourth connecting line CCLy.

The first connecting line CNL1 and the second connecting line CNL2 provided on the circuit film FPC may have a low resistance of several ohms ($\Omega$). As the resistances of the first connecting line CNL1 and the second connecting line CNL2 are decreased, a difference between a timing at which the first driver IC 220C1 receives a signal from the first boundary electrode 222a and a timing at which the second driver IC 220C2 receives a signal from the first boundary electrode 222a may be decreased. Furthermore, a difference between a timing at which the first driver IC 220C1 receives a signal from the second boundary electrode 222b and a timing at which the second driver IC 220C2 receives a signal from the second boundary electrode 222b may also be decreased. Accordingly, the sensing sensitivity of the sensor layer 200 may be improved.

The circuit film FPC may have a ground, and accordingly, noise introduced into the first connecting line CNL1 and the second connecting line CNL2 may be shielded by the ground. Furthermore, the circuit film FPC may not be directly disposed on the display layer 100 (e.g., refer to FIG. 2). In other words, because the first connecting line CNL1 and the second connecting line CNL2 are spaced apart from the display layer 100 (e.g., refer to FIG. 2), which may be a noise source, an influence of noise by the display layer 100 may be decreased or removed, and thus, the sensing sensitivity of the sensor layer 200 may be improved. Because the circuit film FPC corresponds to a component that is disposed under (e.g., underneath) the display panel DP (e.g., see FIGS. 12A and 12B), it may be easier to adjust the shape and/or the area of the circuit film FPC than to adjust the shape and/or the area of the peripheral area 200NA of the sensor layer 200. Accordingly, when the first connecting line CNL1 and the second connecting line CNL2 are formed on the circuit film FPC, a higher degree of design freedom may be realized or achieved compared to when the first connecting line CNL1 and the second connecting line CNL2 are formed at (e.g., in or on) the peripheral area 200NA of the sensor layer 200.

Figure 8:
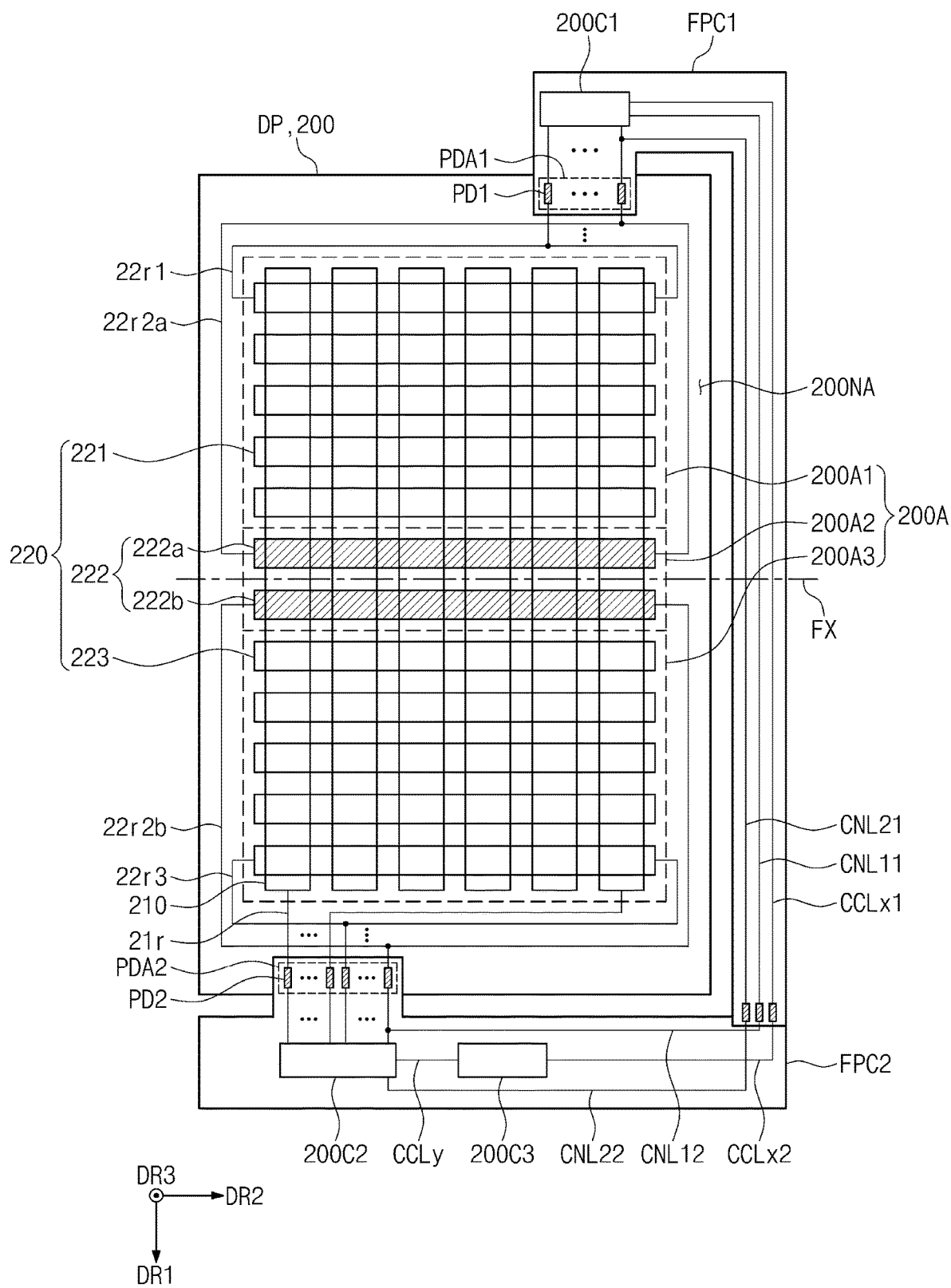
FIG. 8 is a plan view illustrating a display panel and a circuit film according to an embodiment of the present disclosure.

FIG. 8 is a plan view illustrating a display panel and a circuit film according to an embodiment of the present disclosure. In FIG. 8, the components that are the same or substantially the same as the components described above with reference to FIG. 7 are denoted with the same reference symbols, and thus, redundant description thereof may not be repeated, and the differences between the embodiments of FIGS. 7 and 8 may be mainly described in more detail hereinafter.

Referring to FIGS. 5 and 8, a first circuit film FPC1 and a second circuit film FPC2 may be attached to the display panel DP. The first circuit film FPC1 may be attached to the first pad area PDA1, and the second circuit film FPC2 may be attached to the second pad area PDA2. The first circuit film FPC1 and the second circuit film FPC2 may be electrically connected with each other. For example, the first circuit film FPC1 and the second circuit film FPC2 may be electrically connected to each other via pads on the first circuit film FPC1 and the second circuit film FPC2, but the present disclosure is not limited thereto.

The first driver IC 200C1 may be mounted on the first circuit film FPC1. The second driver IC 200C2 and the microcontroller 200C3 may be mounted on the second circuit film FPC2.

The first circuit film FPC1 may include a first connecting line CNL11, a second connecting line CNL21, and a third connecting line CCLx1. The second circuit film FPC2 may include a first connecting line CNL12, a second connecting line CNL22, a third connecting line CCLx2, and a fourth connecting line CCLy. The first connecting line CNL11 may be electrically connected to the first connecting line CNL12, the second connecting line CNL21 may be electrically connected to the second connecting line CNL22, and the third connecting line CCLx1 may be electrically connected to the third connecting line CCLx2.

The first driver IC 200C1 and the second boundary electrode 222b may be electrically connected to each other through the first connecting line CNL11 and the first connecting line CNL12. The second driver IC 200C2 and the first boundary electrode 222a may be electrically connected to each other through the second connecting line CNL21 and the second connecting line CNL22. The first driver IC 200C1 and the microcontroller 200C3 may be electrically connected to each other by the third connecting line CCLx1 and the third connecting line CCLx2. The second driver IC 200C2 and the microcontroller 200C3 may be electrically connected to each other by the fourth connecting line CCLy.

Figure 9:
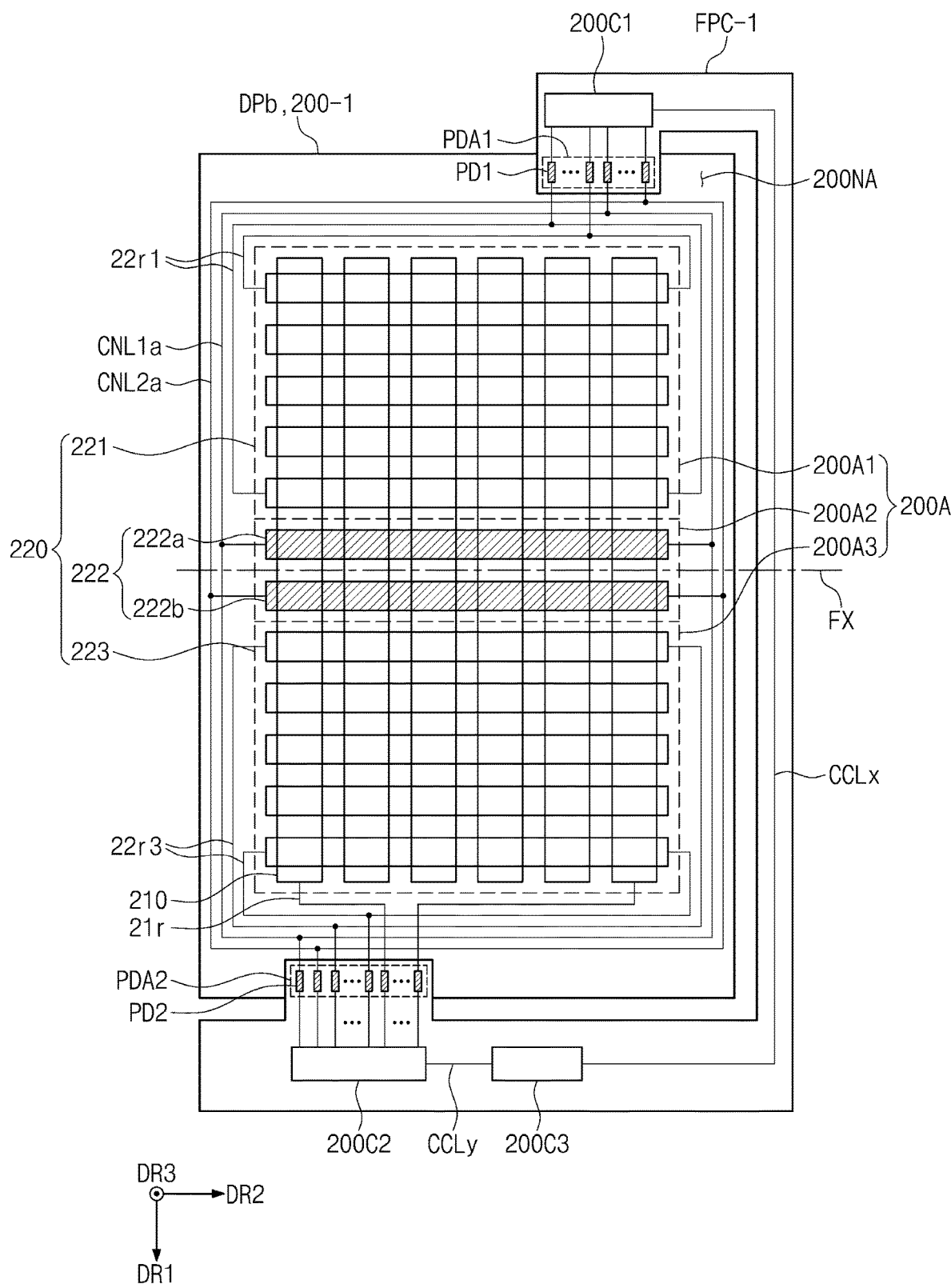
FIG. 9 is a plan view illustrating a display panel and a circuit film according to an embodiment of the present disclosure.

FIG. 9 is a plan view illustrating a display panel and a circuit film according to an embodiment of the present disclosure. In FIG. 9, the components that are the same or substantially the same as the components described above with reference to FIG. 7 are denoted with the same reference symbols, and thus, redundant description thereof may not be repeated, and the differences between the embodiments of FIGS. 7 and 9 may be mainly described in more detail hereinafter.

Referring to FIGS. 5 and 9, the circuit film FPC-1 may be attached to the display panel DPb. The circuit film FPC-1 may be attached to the first pad area PDA1 and the second pad area PDA2.

A sensor layer 200-1 may further include a first connecting line CNL1a and a second connecting line CNL2a. The first connecting line CNL1a and the second connecting line CNL2a may be disposed at (e.g., in or on) the peripheral area 200NA, and may surround (e.g., around a periphery of) the active area 200A. The first connecting line CNL1a and the second connecting line CNL2a may each surround both the plurality of electrodes 210 and the plurality of intersecting electrodes 220.

The first connecting line CNL1a may be electrically connected with one of the second intersecting electrodes 222, and the second connecting line CNL2a may be electrically connected with the other second intersecting electrode 222. For example, the first connecting line CNL1a may be electrically connected to the first boundary electrode 222a, and the second connecting line CNL2a may be electrically connected to the second boundary electrode 222b.

The first driver IC 200C1 may be electrically connected with the first connecting line CNL1a and the second connecting line CNL2a, and the second driver IC 200C2 may be electrically connected with the first connecting line CNL1a and the second connecting line CNL2a. In other words, the first boundary electrode 222a may be connected to both the first driver IC 200C1 and the second driver IC 200C2 through the first connecting line CNL1a, and the second boundary electrode 222b may be connected to both the first driver IC 200C1 and the second driver IC 200C2 through the second connecting line CNL2a. The first and second connecting lines CNL1a and CNL2a, which connect the first and second boundary electrodes 222a and 222b to the first and second driver ICs 200C1 and 200C2, may have a shape surrounding (e.g., around a periphery of) the active area 200A. The paths or lengths of the first and second connecting lines CNL1a and CNL2a may be decreased, and accordingly, a probability that noise may be introduced into the first and second connecting lines CNL1a and CNL2a may be decreased or removed.

Figure 10:
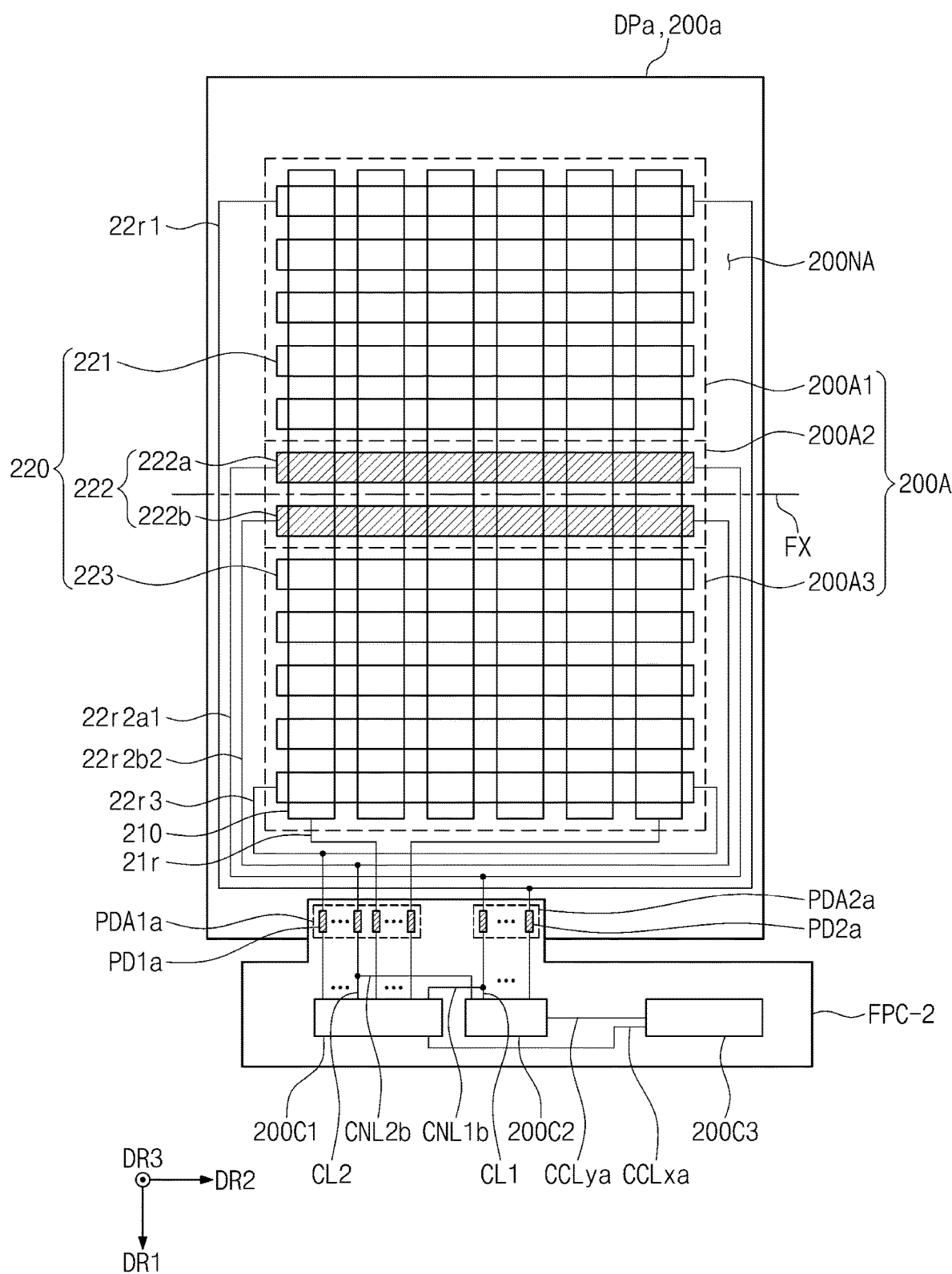
FIG. 10 is a plan view illustrating a display panel and a circuit film according to an embodiment of the present disclosure.

FIG. 10 is a plan view illustrating a display panel and a circuit film according to an embodiment of the present disclosure.

Referring to FIGS. 6 and 10, the circuit film FPC-2 may be attached to the display panel DPa. The circuit film FPC-2 may be a flexible circuit film. The circuit film FPC-2 may be connected to (e.g., coupled to or attached to) the first pad area PDA1a and the second pad area PDA2a.

The first pad area PDA1a and the second pad area PDA2a may not overlap with the folding area FA (e.g., refer to FIG. 1A). For example, the first pad area PDA1a and the second pad area PDA2a may be spaced apart from the folding axis FX in the first direction DR1. The first pad area PDA1a and the second pad area PDA2a may be adjacent to each other in the second direction DR2.

The plurality of first pads PD1a and the plurality of second pads PD2a may be spaced apart from each other along the second direction DR2. The direction in which the plurality of first pads PD1a and the plurality of second pads PD2a are arranged may be the same or substantially the same as the extending direction in which the folding axis FX extends.

All of the plurality of electrodes 210 may be electrically connected to the first driver IC 200C1. However, the present disclosure is not limited thereto. For example, all of the plurality of electrodes 210 may be electrically connected to the second driver IC 200C2. As another example, some of the plurality of electrodes 210 may be electrically connected to the first driver IC 200C1, and the others of the plurality of electrodes 210 may be electrically connected to the second driver IC 200C2.

The first intersecting electrodes 221 may be electrically connected to the second driver IC 200C2, the second intersecting electrodes 222 may be electrically connected to both the first driver IC 200C1 and the second driver IC 200C2, and the third intersecting electrodes 223 may be electrically connected to the first driver IC 200C1.

Trace lines 21r, 22r1, 22r2a1, 22r2b2, and 22r3 may be disposed at (e.g., in or on) the peripheral area 200NA of the sensor layer 200a. For example, the trace lines 21r, 22r1, 22r2a1, 22r2b2, and 22r3 may include first trace lines 21r, second trace lines 22r1, a third trace line 22r2a1, a fourth trace line 22r2b2, and fifth trace lines 22r3.

The electrodes 210 may be electrically connected to the first driver IC 200C1 via the first trace lines 21r. The first intersecting electrodes 221 may be electrically connected to the second driver IC 200C2 via the second trace lines 22r1. The first boundary electrode 222a of the second intersecting electrodes 222 may be electrically connected to both the first driver IC 200C1 and the second driver IC 200C2 via the third trace line 22r2a1. The second boundary electrode 222b of the second intersecting electrodes 222 may be electrically connected to both the first driver IC 200C1 and the second driver IC 200C2 via the fourth trace line 22r2b2. The third intersecting electrodes 223 may be electrically connected to the first driver IC 200C1 via the fifth trace lines 22r3.

The first driver IC 200C1, the second driver IC 200C2, and the microcontroller 200C3 may all be mounted on the circuit film FPC-2. The circuit film FPC-2 may include a first line CL1, a second line CL2, a first connecting line CNL1b, a second connecting line CNL2b, a third connecting line CCLxa, and a fourth connecting line CCLya.

The first line CL1 may electrically connect the first boundary electrode 222a and the second driver IC 200C2 to each other. The second line CL2 may electrically connect the second boundary electrode 222b and the first driver IC 200C1 to each other. The first connecting line CNL1b may electrically connect the first line CL1 and the first driver IC 200C1 to each other, and the second connecting line CNL2b may electrically connect the second line CL2 and the second driver IC 200C2 to each other.

Figure 11:
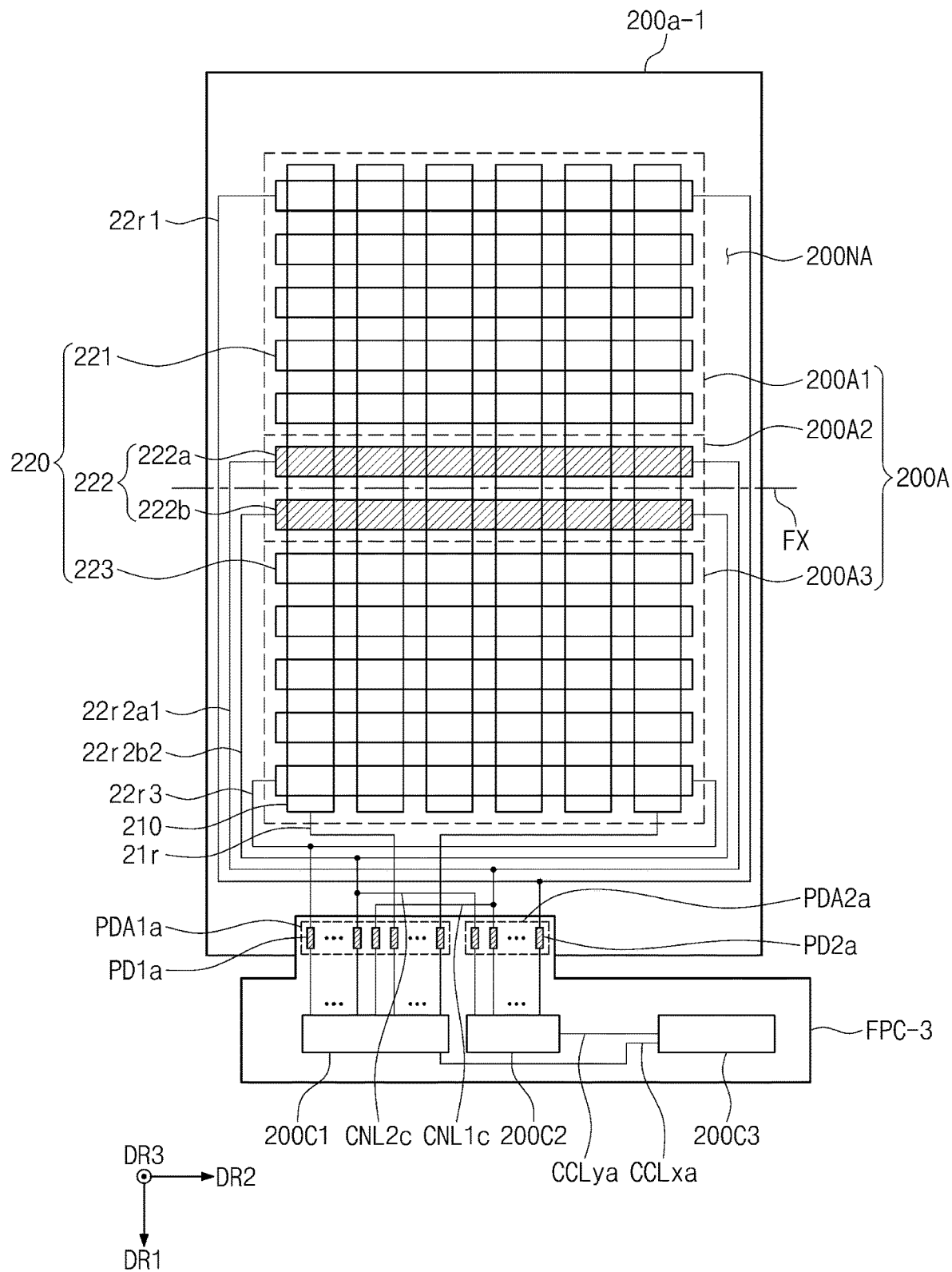
FIG. 11 is a plan view illustrating a display panel and a circuit film according to an embodiment of the present disclosure.

FIG. 11 is a plan view illustrating a display panel and a circuit film according to an embodiment of the present disclosure. In FIG. 11, the components that are the same or substantially the same as the components described above with reference to FIG. 10 are denoted with the same reference symbols, and thus, redundant description thereof may not be repeated, and the differences between the embodiments of FIGS. 10 and 11 may be mainly described in more detail hereinafter.

Referring to FIG. 11, a sensor layer 200a-1 may be electrically connected with the circuit film FPC-3.

A first connecting line CNL1c and a second connecting line CNL2c may be provided in the sensor layer 200a-1. For example, the first connecting line CNL1c and the second connecting line CNL2c may be provided at (e.g., in or on) the peripheral area 200NA.

The first connecting line CNL1c may be electrically connected with the third trace line 22r2a1. Furthermore, the first connecting line CNL1c may be electrically connected to a corresponding one of the first pads PD1a. Accordingly, the first boundary electrode 222a may be electrically connected with the first driver IC 200C1 via the first connecting line CNL1c.

The second connecting line CNL2c may be electrically connected with the fourth trace line 22r2b2. Furthermore, the second connecting line CNL2c may be electrically connected to a corresponding one of the second pads PD2a. Accordingly, the second boundary electrode 222b may be electrically connected with the second driver IC 200C2 via the second connecting line CNL2c.

Figure 12A:
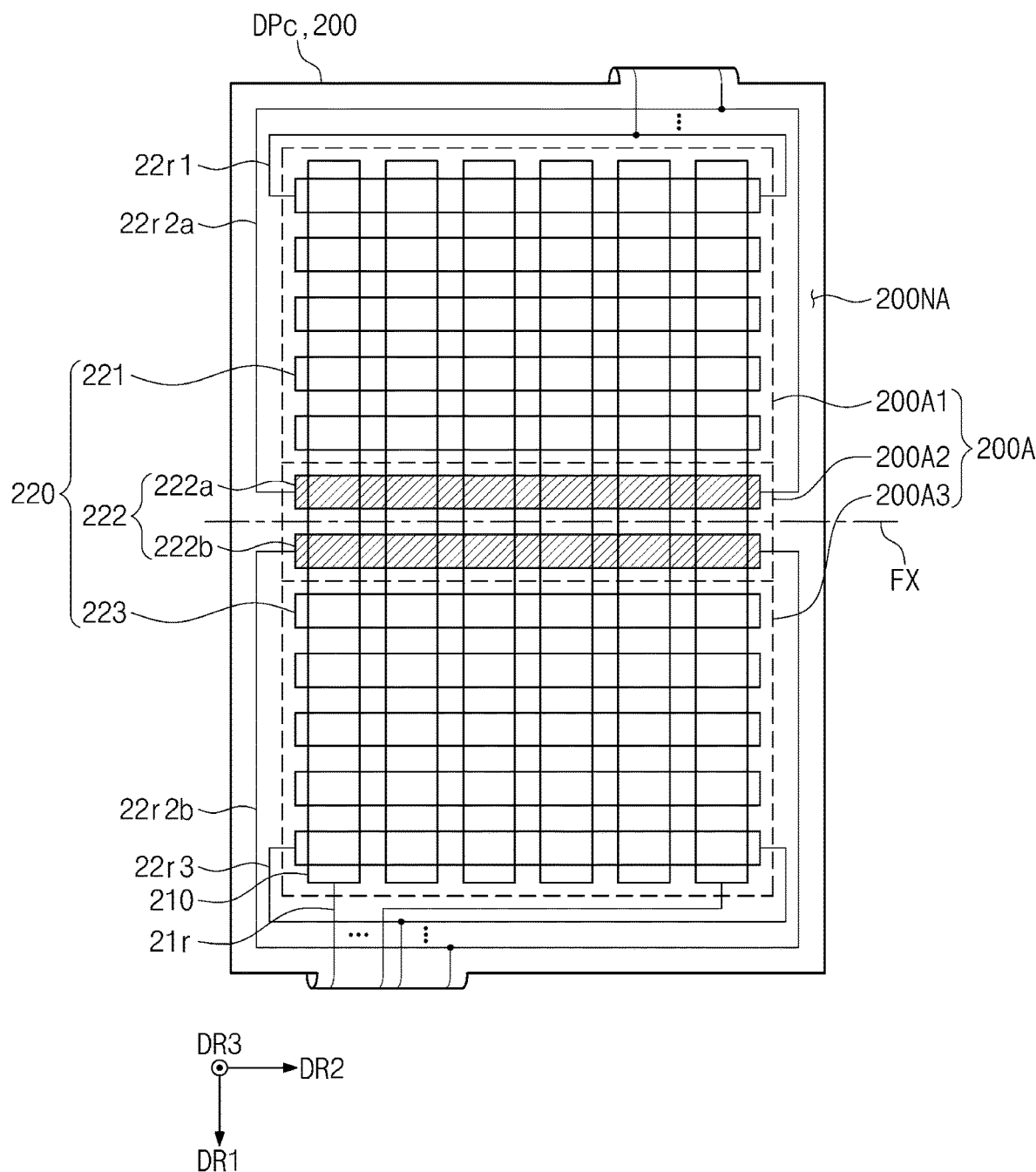
FIG. 12A is a plan view illustrating a display panel and a circuit film according to an embodiment of the present disclosure.
Figure 12B:
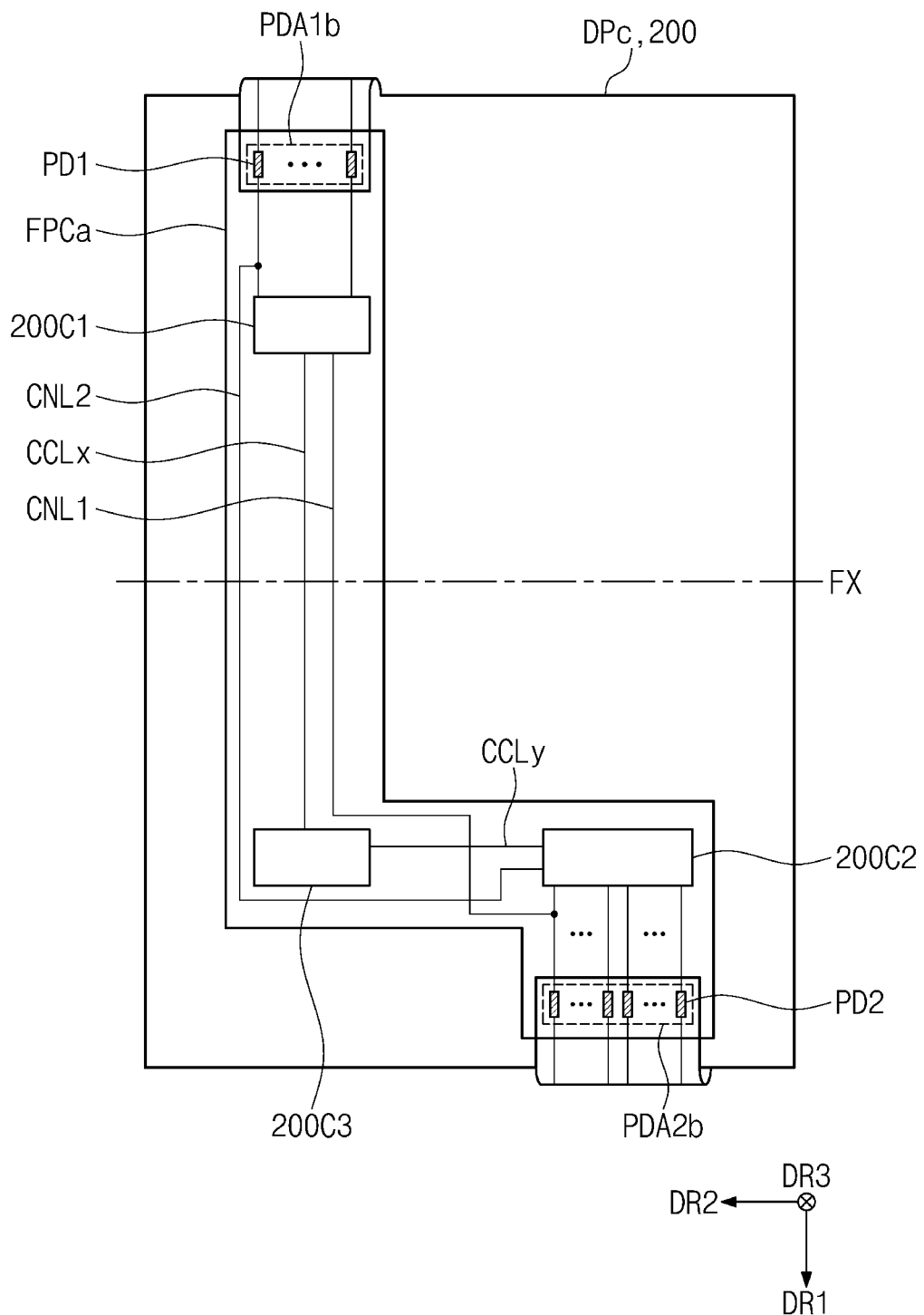
FIG. 12B is a rear view of the display panel and the circuit film illustrated in FIG. 12A.

FIG. 12A is a plan view illustrating a display panel and a circuit film according to an embodiment of the present disclosure. FIG. 12B is a rear view of the display panel and the circuit film illustrated in FIG. 12A.

Referring to FIGS. 12A and 12B, a portion of the display panel DPc where the first pad area PDA1b is defined, and a portion of the display panel DPc where the second pad area PDA2b is defined, may be bent toward a rear surface of the display panel DPc. Accordingly, when the display panel DPc is viewed from the front as shown in FIG. 12A, the first pad area PDA1b and the second pad area PDA2b may not be visible. As the first pad area PDA1b and the second pad area PDA2b are disposed on the rear surface of the display panel DPc, the area of the non-display area NDA (e.g., refer to FIG. 1A) of the display device 1000 may be decreased.

The circuit film FPCa may be disposed on the rear surface of the display panel DPc, and may be connected to (e.g., coupled to or attached to) the display panel DPc. For example, the circuit film FPCa may be connected to (e.g., coupled to or attached to) the first pad area PDA1b and the second pad area PDA2b. The circuit film FPCa may be a flexible circuit film. When the display panel DPc is folded and unfolded about the folding axis FX, the circuit film FPCa may be folded and unfolded together with the display panel DPc.

The first driver IC 200C1, the second driver IC 200C2, and the microcontroller 200C3 may be mounted on the circuit film FPCa. The first driver IC 200C1, the second driver IC 200C2, and the microcontroller 200C3 may be disposed at (e.g., in or on) an area that does not overlap with the folding axis FX, and at (e.g., in or on) an area that does not overlap with the folding area FA (e.g., refer to FIGS. 1A and 1B).

Although an example shape of the circuit film FPCa is illustrated in FIG. 12B, the shape of the circuit film FPCa is not limited to the example illustrated in FIG. 12B. For example, as long as the circuit film FPCa is capable of being connected to (e.g., coupled to or attached to) the first pad area PDA1b and the second pad area PDA2b, the shape of the circuit film FPCa may be variously modified as needed or desired.

Although FIGS. 12A and 12B illustrate an example in which the first pad area PDA1b and the second pad area PDA2b of the display panel DPc are bent toward the rear surface of the display panel DPc, the present disclosure is not limited thereto. For example, the first pad area PDA1b and the second pad area PDA2b of the display panel DPc may not be bent toward the rear surface of the display panel DPc as illustrated in FIG. 12B, and the circuit film FPCa may be disposed on the rear surface of the display panel DPc. In this case, a portion (or portions) of the circuit film FPCa may be bent toward an upper surface of the display panel DPc, and may be connected to (e.g., coupled to or attached to) the first pad area PDA1b and the second pad area PDA2b.

Figure 13:
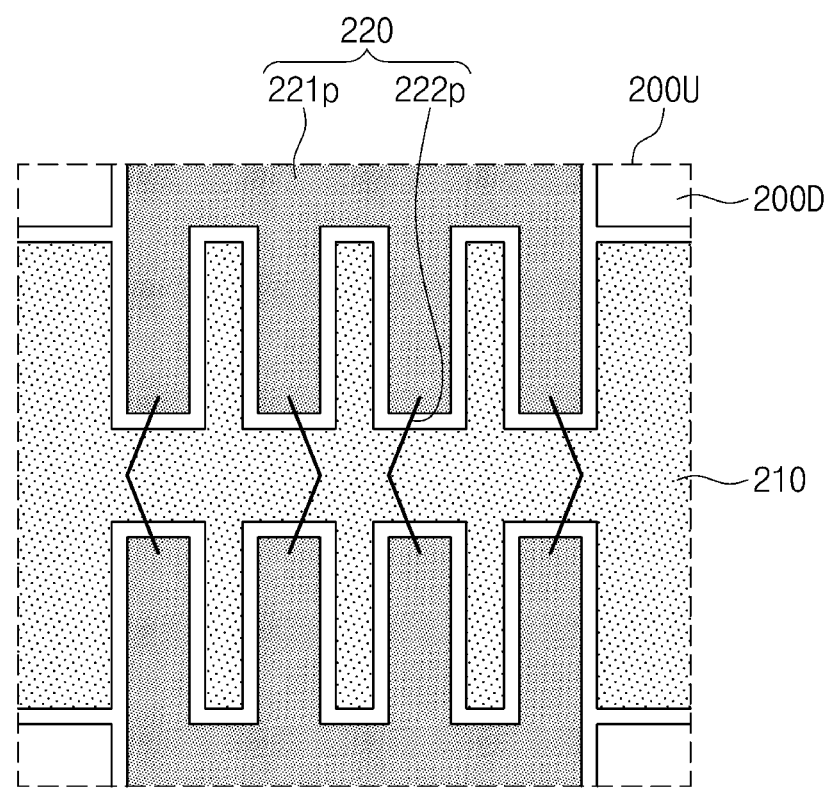
FIG. 13 is an enlarged plan view illustrating a sensing unit illustrated in FIG. 5.
Figure 13:
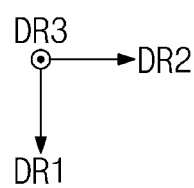

FIG. 13 is an enlarged plan view illustrating a sensing unit illustrated in FIG. 5.

Referring to FIG. 13, a portion of one electrode 210 and a portion of one intersecting electrode 220 may be defined as one sensing unit (e.g., as one sensor or one sensing area) 200U.

The intersecting electrode 220 may include interdigitated patterns 221p, and bridge patterns 222p electrically connected to the interdigitated patterns 221p. The interdigitated patterns 221p may be spaced apart from each other with the electrode 210 therebetween. The bridge patterns 222p may overlap with the electrode 210. The bridge patterns 222p may insulatively cross the electrode 210.

The interdigitated patterns 221p and the electrode 210 may be disposed at (e.g., in or on) the same layer as each other, and the bridge patterns 222p may be disposed at (e.g., in or on) a different layer from those of the interdigitated patterns 221p and the electrode 210. For example, the interdigitated patterns 221p and the electrode 210 may be included at (e.g., in or on) the second conductive layer 204 (e.g., refer to FIG. 4), and the bridge patterns 222p may be included at (e.g., in or on) the first conductive layer 202 (e.g., refer to FIG. 4). This structure may be referred to as a bottom bridge structure. However, the present disclosure is not particularly limited thereto. For example, the interdigitated patterns 221p and the electrode 210 may be included at (e.g., in or on) the first conductive layer 202 (e.g., refer to FIG. 4), and the bridge patterns 222p may be included at (e.g., in or on) the second conductive layer 204 (e.g., refer to FIG. 4). This structure may be referred to as a top bridge structure.

In addition, the sensor layer 200 (e.g., refer to FIG. 4) may further include a dummy pattern 200D disposed at (e.g., in or on) an area where the interdigitated patterns 221p and the electrode 210 are not disposed. The dummy pattern 200D may be a component for preventing or substantially preventing the electrode 210 and the intersecting electrode 220 from being visible from the outside. The dummy pattern 200D may be an electrically-floated pattern. The dummy pattern 200D may be referred to as a pattern or a floating pattern. The dummy pattern 200D may be disposed at (e.g., in or on) the same layer as those of the interdigitated patterns 221p and the electrode 210.

The interdigitated patterns 221p, the electrode 210, and the dummy pattern 200D may each have a mesh structure. In this case, openings may be defined in each of the interdigitated patterns 221p, the electrode 210, and the dummy pattern 200D. However, the present disclosure is not limited thereto, and the interdigitated patterns 221p, the electrode 210, and the dummy pattern 200D may each be implemented with a transparent electrode having no openings defined therein.

Figure 14:
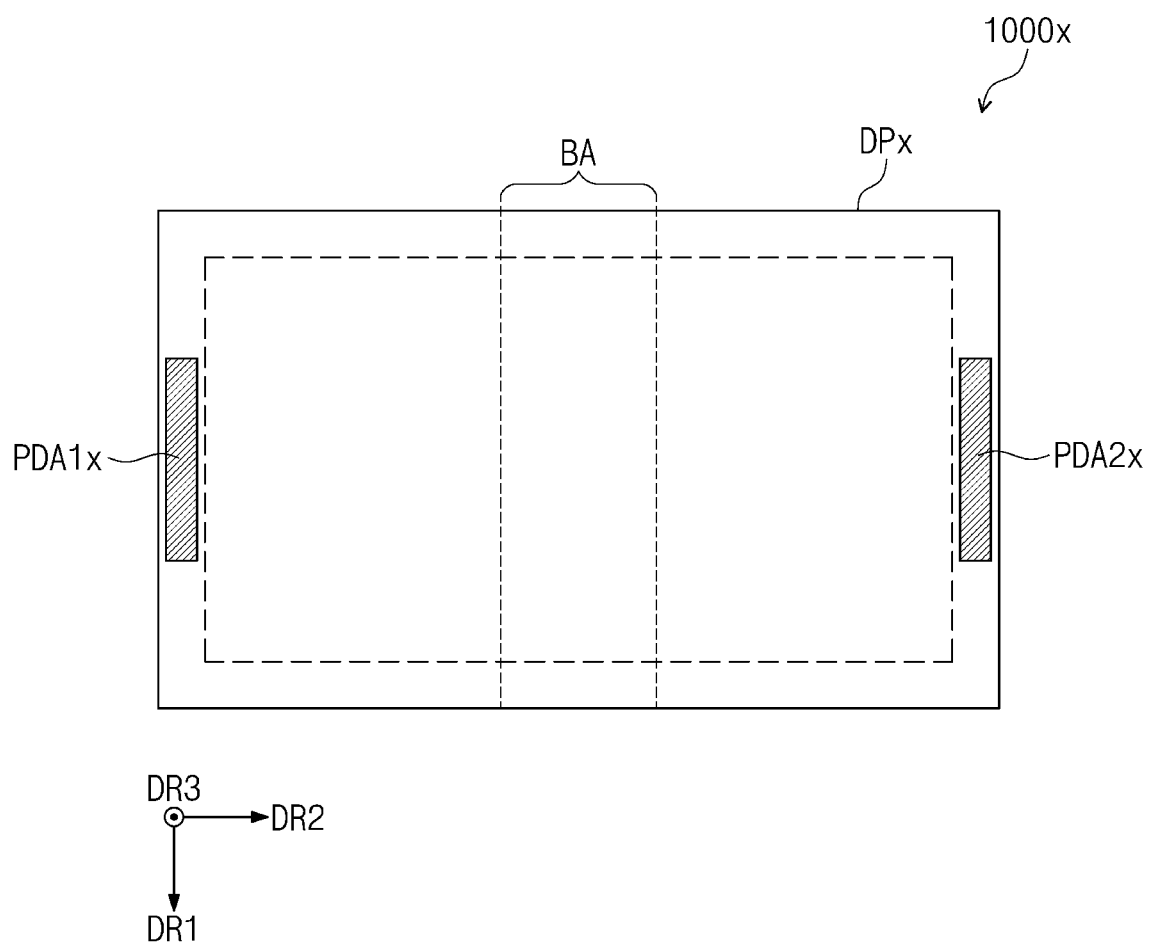
FIG. 14 is a plan view of a display device according to an embodiment of the present disclosure.

FIG. 14 is a plan view of a display device according to an embodiment of the present disclosure.

Referring to FIG. 14, the display device 1000x may be a rigid display device. The display device 1000x may include a display panel DPx. A sensor layer of the display panel DPx may be controlled by a plurality of driver ICs. The plurality of driver ICs may include the first driver IC 200C1 and the second driver IC 200C2 (e.g., refer to FIG. 5). A portion of the sensor layer that is sensed by both the first driver IC 200C1 and the second driver IC 200C2 (e.g., refer to FIG. 5) may be defined as a boundary area BA. For example, the boundary area BA may correspond to the second area 200A2 described above with reference to FIGS. 5 to 11.

A first pad area PDA1x and a second pad area PDA2x may be defined on the display panel DPx. The first pad area PDA1x and the second pad area PDA2x may be spaced apart from each other in a direction (e.g., the second direction DR2) that crosses an extending direction (e.g., the first direction DR1) in which the boundary area BA extends. A plurality of pads may be disposed at (e.g., in or on) each of the first pad area PDA1x and the second pad area PDA2x. The plurality of pads may be spaced apart from each other in the first direction DR1.

The first driver IC 200C1 (e.g., refer to FIG. 5) may be electrically connected to the sensor layer through the first pad area PDA1x, and the second driver IC 200C2 (e.g., refer to FIG. 5) may be electrically connected to the sensor layer through the second pad area PDA2x. As another example, both the first driver IC 200C1a and the second driver IC 200C2a (e.g., refer to FIG. 6) may be connected to the first pad area PDA1x or the second pad area PDA2x.

Figure 15:
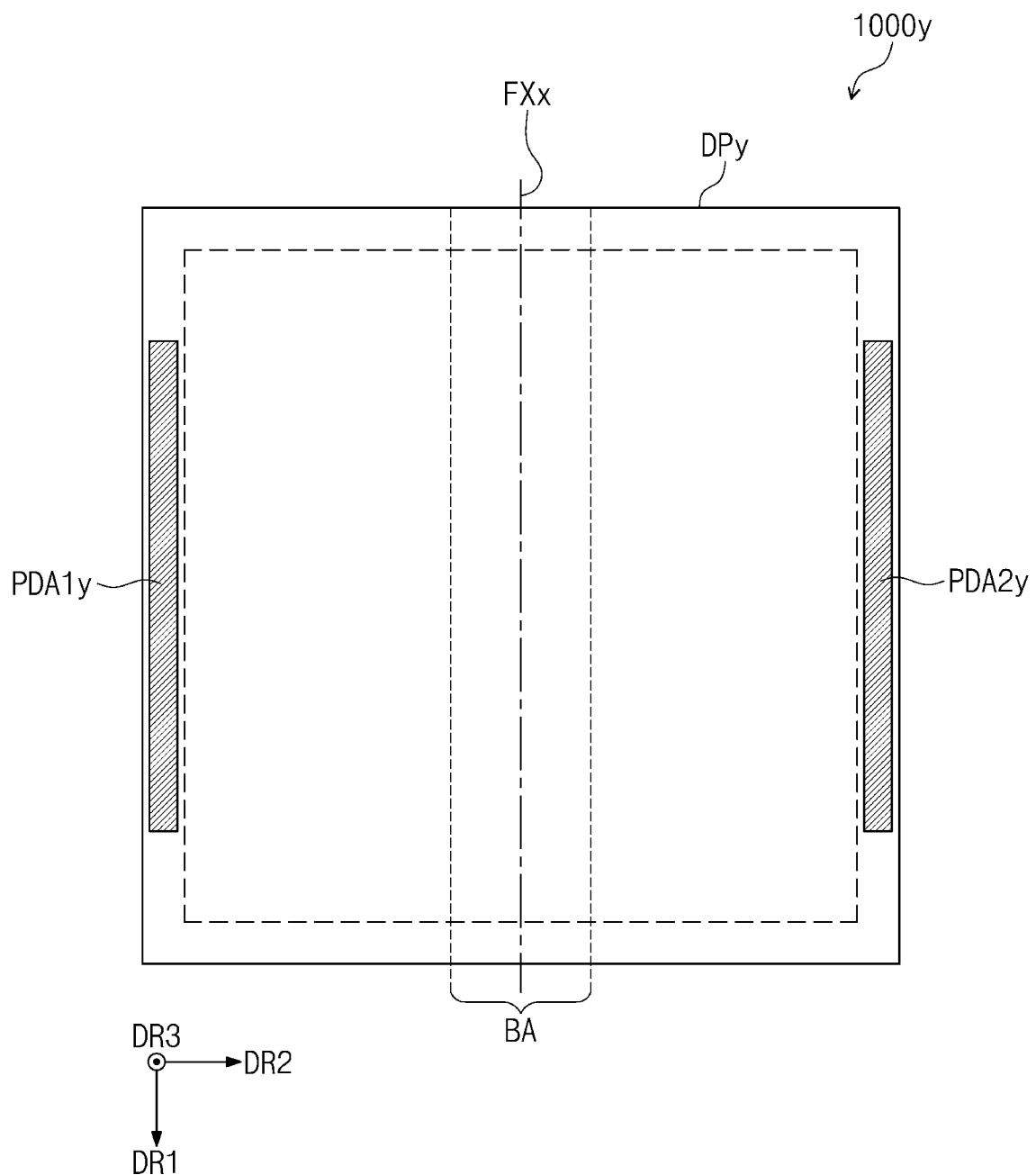
FIG. 15 is a plan view of a display device according to an embodiment of the present disclosure.

FIG. 15 is a plan view of a display device according to an embodiment of the present disclosure.

Referring to FIG. 15, the display device 1000y may be a foldable display device 1000y that is folded or unfolded. The display device 1000y may include a display panel DPy. For example, the display panel DPy may be bent about a folding axis FXx that is parallel to or substantially parallel to the first direction DR1, which may be a direction in which the long sides of the display device 1000y extend. However, the present disclosure is not limited thereto, and the display panel may be bent based on a folding axis parallel to short sides of the display device.

A sensor layer of the display panel DPy may be controlled by a plurality of driver ICs. The plurality of driver ICs may include the first driver IC 200C1 and the second driver IC 200C2 (e.g., refer to FIG. 5). A portion of the sensor layer that is sensed by both the first driver IC 200C1 and the second driver IC 200C2 (e.g., refer to FIG. 5) may be defined as a boundary area BA. For example, the boundary area BA may correspond to the second area 200A2 described above with reference to FIGS. 5 to 11. A direction in which the boundary area BA extends may be the same or substantially the same as the direction in which the folding axis FXx extends, for example, such as the first direction DR1. The folding axis FXx may overlap with the boundary area BA.

A first pad area PDA1y and a second pad area PDA2y may be defined on the display panel DPy. The first pad area PDA1y and the second pad area PDA2y may each be spaced apart from the boundary area BA in the second direction DR2. A plurality of pads may be disposed at (e.g., in or on) each of the first pad area PDA1y and the second pad area PDA2y. The plurality of pads may be spaced apart from each other in the first direction DR1.

The first driver IC 200C1 (e.g., refer to FIG. 5) may be electrically connected to the sensor layer through the first pad area PDA1y, and the second driver IC 200C2 (e.g., refer to FIG. 5) may be electrically connected to the sensor layer through the second pad area PDA2y. As another example, both the first driver IC 200C1a (e.g., refer to FIG. 6) and the second driver IC 200C2a (e.g., refer to FIG. 6) may be connected to the first pad area PDA1y or the second pad area PDA2y.

According to one or more embodiments of the present disclosure described above, the sensor layer may be controlled by the plurality of driver ICs. Some of the electrodes of the sensor layer, for example, the boundary electrodes, may all be connected to the plurality of driver ICs. The sensing sensitivity of the sensor layer may be improved by minimizing or reducing the paths of the connecting lines that connect the boundary electrodes and the plurality of driver ICs to one another, or by minimizing or reducing a resistance thereof.

For example, in some embodiments, the connecting lines, which connect the boundary electrodes and the plurality of driver ICs to one another, may be disposed on the circuit film. In this case, the connecting lines provided on the circuit film may have a low resistance of several ohms. Accordingly, a difference between timings at which the plurality of driver ICs receive signals from the same boundary electrode may be decreased or removed. Furthermore, as the connecting lines are provided on the circuit film, noise introduced into the connecting lines may be decreased. Thus, the sensing sensitivity of the sensor layer may be improved.

For example, in some embodiments, the connecting lines may be provided at (e.g., in or on) the peripheral area of the sensor layer. In this case, the connecting lines, which connect the boundary electrodes and the plurality of driver ICs to one another, may have a shape surrounding (e.g., around a periphery of) the active area. Accordingly, the paths or lengths of the connecting lines may be decreased, and a probability that noise may be introduced into the connecting lines may be decreased or removed.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display device comprising:
    a display panel comprising:
        a display layer configured to display an image; and
        a sensor layer on the display layer, and configured to sense an external input, the sensor layer comprising a first area, a second area adjacent to the first area in a first direction, and a third area adjacent to the second area in the first direction;
    a first driver electrically connected with the sensor layer through a first pad area of the display panel; and
    a second driver electrically connected with the sensor layer through a second pad area of the display panel,
    wherein the sensor layer comprises:
        a plurality of electrodes spaced from each other along a second direction crossing the first direction, each of the plurality of electrodes being located at the first area, the second area, and the third area;
        a plurality of first intersecting electrodes at the first area, and spaced from each other along the first direction, the plurality of first intersecting electrodes being electrically connected with the first driver from among the first and second drivers;
        a plurality of second intersecting electrodes at the second area, and spaced from each other along the first direction, each of the plurality of second intersecting electrodes being electrically connected with both the first driver and the second driver; and
        a plurality of third intersecting electrodes at the third area, and spaced from each other along the first direction, the plurality of third intersecting electrodes being electrically connected with the second driver from among the first and second drivers.

2. The display device of claim 1, wherein the first pad area and the second pad area are spaced from each other with the first to third areas therebetween.

3. The display device of claim 2, further comprising:
    a circuit film attached to the first pad area and the second pad area,
    wherein the first driver and the second driver are on the circuit film.

4. The display device of claim 3, wherein the circuit film comprises:
    a first connecting line configured to connect the first driver and one of the plurality of second intersecting electrodes to each other; and
    a second connecting line configured to connect the second driver and another one of the plurality of second intersecting electrodes to each other.

5. The display device of claim 2, further comprising:
    a first circuit film attached to the first pad area; and
    a second circuit film attached to the second pad area, and electrically connected to the first circuit film,
    wherein the first driver is on the first circuit film, and the second driver is on the second circuit film.

6. The display device of claim 1,
    wherein the sensor layer comprises an active area, and a peripheral area around the active area,
    wherein the plurality of electrodes, the plurality of first intersecting electrodes, the plurality of second intersecting electrodes, and the plurality of third intersecting electrodes are at the active area, and
    wherein the sensor layer further comprises:
        a first connecting line at the peripheral area, and surrounding the active area, the first connecting line being electrically connected with one of the plurality of second intersecting electrodes; and
        a second connecting line at the peripheral area and surrounding the active area, the second connecting line being electrically connected with another one of the plurality of second intersecting electrodes.

7. The display device of claim 6, wherein the first driver and the second driver are electrically connected with the first connecting line and the second connecting line, respectively.

8. The display device of claim 1, wherein the first pad area and the second pad area are spaced from the third area in the first direction, and are adjacent to each other in the second direction,
    wherein the display device further comprises a circuit film attached to the first pad area and the second pad area, and
    wherein the first driver and the second driver are on the circuit film.

9. The display device of claim 8, wherein the circuit film comprises:
    a first line electrically connected to one of the plurality of second intersecting electrodes, and to the second driver;
    a second line electrically connected to another one of the plurality of second intersecting electrodes, and to the first driver;
    a first connecting line configured to connect the first line and the first driver to each other; and
    a second connecting line configured to connect the second line and the second driver to each other.

10. The display device of claim 1, wherein the display panel comprises:
    a plurality of first pads at the first pad area; and
    a plurality of second pads at the second pad area, and
    wherein the plurality of first pads are spaced from each other in the second direction, and the plurality of second pads are spaced from each other in the second direction.

11. The display device of claim 1, wherein the display panel comprises a folding area configured to be folded and unfolded about a folding axis extending in the second direction, the folding axis overlapping with the second area.

12. A display device comprising:
    a display panel comprising:
        a display layer configured to display an image; and
        a sensor layer on the display layer, and configured to sense an external input, the sensor layer comprising a first area, a second area adjacent to the first area in a first direction, and a third area adjacent to the second area in the first direction;
    a first driver electrically connected with the sensor layer through a first pad area of the display panel; and
    a second driver electrically connected with the sensor layer through a second pad area of the display panel,
    wherein the display panel is configured to be folded and unfolded about a folding axis extending in a second direction crossing the first direction, the folding axis overlapping with the second area, and wherein the sensor layer comprises a plurality of intersecting electrodes located at the second area, each of the intersecting electrodes being connected to both the first driver and the second driver.

13. The display device of claim 12, wherein the sensor layer further comprises:
a plurality of electrodes spaced from each other in the second direction, each of the plurality of electrodes being located at the first area, the second area, and the third area;
a plurality of first intersecting electrodes at the first area, and spaced from each other in the first direction, the plurality of first intersecting electrodes being electrically connected with the first driver; and
a plurality of second intersecting electrodes at the third area, and spaced from each other in the first direction, the plurality of second intersecting electrodes being electrically connected with the second driver.

14. The display device of claim 13, wherein the sensor layer further comprises:
a first connecting line electrically connected to one of the plurality of intersecting electrodes; and
a second connecting line electrically connected with another one of the plurality of intersecting electrodes, and
wherein each of the first connecting line and the second connecting line surrounds the plurality of electrodes, the plurality of first intersecting electrodes, the plurality of intersecting electrodes, and the plurality of second intersecting electrodes.

15. The display device of claim 13, further comprising:
a circuit film attached to the first pad area and the second pad area,
wherein the first driver and the second driver are on the circuit film.

16. The display device of claim 15, wherein the circuit film comprises:
a first connecting line configured to connect the first driver and one of the plurality of intersecting electrodes to each other; and
a second connecting line configured to connect the second driver and another one of the plurality of intersecting electrodes to each other.

17. The display device of claim 13, wherein the first pad area and the second pad area are spaced from each other with the first to third areas therebetween.

18. The display device of claim 13, wherein the first pad area and the second pad area are spaced from the third area in the first direction, and are adjacent to each other in the second direction.

19. A display device comprising:
a sensor layer comprising:
a plurality of electrodes; and
a plurality of first, second, and third intersecting electrodes crossing the plurality of electrodes;
a first driver electrically connected with the plurality of first intersecting electrodes and each of the plurality of second intersecting electrodes through a plurality of first pads; and
a second driver electrically connected with each of the plurality of second intersecting electrodes and the plurality of third intersecting electrodes through a plurality of second pads,
wherein the sensor layer further comprises:
a first area, the plurality of first intersecting electrodes being located at the first area;
a second area, the plurality of second intersecting electrodes being located at the second area; and
a third area, the plurality of third intersecting electrodes being located at the third area,
wherein the first area, the second area, and the third area are adjacent to one another along a first direction.

20. The display device of claim 19, further comprising:
a circuit film attached to the plurality of first pads and the plurality of second pads, the first driver and the second driver being located on the circuit film, and
wherein the circuit film comprises:
a first connecting line configured to connect the first driver and one of the plurality of second intersecting electrodes to each other; and
a second connecting line configured to connect the second driver and another one of the plurality of second intersecting electrodes to each other.

21. The display device of claim 19, wherein the sensor layer further comprises:
a first connecting line electrically connected to one of the plurality of second intersecting electrodes; and
a second connecting line electrically connected to another one of the plurality of second intersecting electrodes, and
wherein each of the first connecting line and the second connecting line surrounds the plurality of electrodes, the plurality of first intersecting electrodes, the plurality of second intersecting electrodes, and the plurality of third intersecting electrodes.

* * * * *